(12) United States Patent
Takeuchi

(10) Patent No.: US 8,266,467 B2
(45) Date of Patent: Sep. 11, 2012

(54) DATA TRANSFER DEVICE AND DATA TRANSFER METHOD

(75) Inventor: Toshiki Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 318 days.

(21) Appl. No.: 12/669,508

(22) PCT Filed: Jul. 24, 2008

(86) PCT No.: PCT/JP2008/063305
§ 371 (c)(1),
(2), (4) Date: Jan. 18, 2010

(87) PCT Pub. No.: WO2009/014182
PCT Pub. Date: Jan. 29, 2009

(65) Prior Publication Data
US 2010/0199006 A1    Aug. 5, 2010

(30) Foreign Application Priority Data

Jul. 24, 2007 (JP) .................................. 2007-192025

(51) Int. Cl.
*H04L 7/00* (2006.01)
*G06F 13/42* (2006.01)
(52) U.S. Cl. ....................... 713/401; 713/503; 710/106
(58) Field of Classification Search .................. 710/107; 713/401
See application file for complete search history.

(56) References Cited

U.S. PATENT DOCUMENTS

| 7,116,744 B2 * | 10/2006 | Saze et al. ................... 375/371 |
| 7,159,138 B2 * | 1/2007 | Aberl et al. .................. 713/600 |
| 7,337,345 B2 * | 2/2008 | Sommer et al. ................ 713/401 |
| 7,490,258 B2 * | 2/2009 | Sakamoto et al. ............. 713/600 |
| 7,966,512 B2 * | 6/2011 | Sakamoto et al. ............. 713/600 |
| 2004/0243877 A1 * | 12/2004 | Sakamoto et al. ............ 713/600 |

FOREIGN PATENT DOCUMENTS

| JP | 7-177134 A | 7/1995 |
| JP | 8-249275 A | 9/1996 |
| JP | 9-93233 A | 4/1997 |
| JP | 9-139731 A | 5/1997 |
| JP | 11-15783 A | 1/1999 |
| JP | 2001265716 A | 9/2001 |
| JP | 2002041445 A | 2/2002 |
| JP | 2004355163 A | 12/2004 |

OTHER PUBLICATIONS

Machine Translation of Japanese Patent No. 9-93233.*
International Search Report for PCT/JP2008/063305 mailed Oct. 14, 2008.

* cited by examiner

*Primary Examiner* — Ryan Stiglic

(57) ABSTRACT

To provide inter-LSI data synchronized transfer with a transfer throughput satisfying a required performance without causing an operation timing difference of the entire system even when a wiring delay between LSIs varies on an evaluation board and an actual device. A master (LSI1) outputs transfer data and a transfer synchronization clock signal to a slave (LSI2). For the edge of a clock signal used for data output at the master (LSI1), the slave (LSI2) latches input data by using a reverse edge. Moreover, upon data transfer from the slave (LSI2) to the master (LSI1), the master (LSI1) selects a latch timing of input data from a plurality of timings so that the transfer time to an internal circuit of the master (LSI1) side is identical regardless of which latch timing is selected.

17 Claims, 12 Drawing Sheets

DATA TRANSFER DEVICE AND DATA TRANSFER METHOD

This Application is the National Phase of PCT/JP2008/063305, filed Jul. 24, 2008, which claims the Priority right based on Japanese Patent Application No. 2007-192025 filed on Jul. 24, 2007, and the disclosure thereof is hereby incorporated by reference in its entirety.

TECHNICAL FIELD

The present invention relates to a data transfer device and a data transfer method. More specifically, the present invention relates to an interface synchronizing technique and a phase adjusting technique, which are employed when transferring data synchronously among a plurality of LSIs.

BACKGROUND ART

Conventionally, for synchronous transmission of data between LSIs, a transmitter-side LSI outputs a transfer clock to a receiver-side LSI along with the transfer data, and the receiver-side LSI reproduces the data by using the transfer clock. In a case where there is mutual transfer of data between the LSIs, different clocks are used for the transfer from a master LSI to a slave LSI and for the transfer from the slave LSI to the master LSI to achieve high-speed transfer. In this case, however, it is necessary to use a relatively complicated circuit device which includes a feedback loop for phase adjustment when the phase of the clock is adjusted on the receiver side. Further, since there is a difference in wiring delay of the LSIs between an evaluation board and an actual device or the like, there may generate a difference in timings on the entire system (between the LSIs) depending on the wiring delay. Such difference may generate a case where the entire system cannot be synchronized or a case where it is difficult to conduct the action timing verification equivalent to that of the actual device with bit precision and cycle precision.

Patent Document 1 depicts a phase detection circuit which separately samples input common data signals at a rise and a fall of a clock signal, and detects phases of the data signals and the clock signal based on the phase difference between the obtained two-system sampling signals. With such phase detection circuit, not only the phase shift generated constantly between the data signal and the clock signal but also the phase shift generated occasionally can be detected securely.

In the meantime, in order to synchronize the timings in the entire system, there is a method with which all the LSIs use a transfer clock that synchronizes with the same timing. Data transfer between the LSIs is achieved by exchanging the data in one cycle on the basis of the transfer clock. In this case, however, the frequency of the transfer clock depends on the wiring delay on the valuation board and the actual device, so that it is sometimes difficult to precisely estimate the wiring delay (load capacity) on both at a designing stage of LSI. Further, when the transfer clock frequency is aligned with the one with the larger wiring delay, the transfer throughput is deteriorated. Therefore, there are cases where the required performance cannot be achieved.

Patent Document 2 discloses a method which performs data transmission from a first LSI to a second LSI with synchronous transmission of 1.5-clock latency, and performs data transmission from the second LSI to the first LSI with synchronous transmission of 1.5-clock latency. This method makes it possible to guarantee the delay time of an input/output buffer including the clock skew between the LSIs and the flip-flop setup time both for the maximum time and minimum time.

In regards to this, Patent Document 3 depicts an information transmission device which can minimize the data delay time for a synchronous clock of a receiver, so that no limit is set in the number of slave devices connected with a small drive capacity even when a plurality of slave devices are connected to a single master device, and no limit is set in the frequency of a communication clock and path length of transmission path lines by the number of connected slave devices.

Patent Document 1: Japanese Unexamined Patent Publication H07-177134
Patent Document 2: Japanese Unexamined Patent Publication H08-249275
Patent Document 3: Japanese Unexamined Patent Publication 2001-265716

DISCLOSURE OF THE INVENTION

Problems to be Solved by the Invention

In the case of Patent Document 1, a timing difference is generated when transferring data between the LSIs due to the wiring delay between the LSIs as described above, so that it is possible that the synchronous state cannot be achieved in the entire system. Further, since the clock phase number used for judgment and the clock phase number that is actually selected are the same, more stable timing cannot be selected. Thus, it may happen that latch timing with a small margin is selected.

In the meantime, in the case of Patent Document 2, the delay time between the LSIs is limited to transfer delay in 1 cycle from 0.5 cycle to 1.5 cycle, so that it cannot be applied to a case where the wiring delay on the evaluation board, the actual device, or the like exceeds a limited range. Further, since the transfer clock is supplied to each LSI from outside, it is also necessary to compensate the wiring delay difference between the supplied clocks.

An object of the present invention is to keep the transfer clock frequency that satisfies the required performance without generating differences in the clocks and transfer timings of the entire system and to achieve synchronous transfer of data between the LSIs, even when the wiring delay between the LSIs varies on the evaluation board, the actual device, and the like.

Means for Solving the Problems

In order to achieve the foregoing object, the data transfer device according to the present invention is a data transfer device which performs data transfer with a partner device, and the data transfer device includes: a clock sending section which transmits a transfer clock to the partner device; and a data receiving section which receives data synchronized with the transfer clock signal from the partner device, wherein the data receiving section includes a latch circuit which latches the data at a rise edge or a fall edge of a delay clock signal that is delayed from the transfer clock signal by a variable delay amount, and processes an output signal of the latch circuit as reception data.

The data transfer method according to the present invention is a data transfer method which performs data transfer with a partner device by transmitting a transfer clock signal and data synchronized with a rise edge or a fall edge of the transfer clock signal and receiving data synchronized with the transfer clock signal from the partner device. The method includes: latching the data at a rise edge or a fall edge of a delay clock signal which is delayed from the transfer clock signal by a variable delay amount; and processing a latched result as reception data.

Effect of the Invention

With the present invention, data is latched as reception data by the delay clock signal. Thus, it is possible to achieve synchronous transfer of data between the LSIs, even when the wiring delay between the LSIs varies on the evaluation board, the actual device, and the like.

BEST MODES FOR CARRYING OUT THE INVENTION

Next, exemplary embodiments of the invention will be described by referring to the drawings.

A data transfer device according to the exemplary embodiments of the invention is a data transfer device which transfer data with a partner device. As shown in FIG. 1, FIG. 10, FIG. 11, and FIG. 12, as the basic structure, the data transfer device includes: a clock sending section 400 which transmits a transfer clock signal CLK(ExCLK) to a partner device (2); and a data receiving section 500 which receives data MDI from the partner device (2) by synchronizing with the transfer clock signal CLK(ExCLK). The data receiving section 500 includes a first latch circuit 21 which latches the data at a rise edge or a fall edge of a delay clock signal DCLK that is delayed from the transfer clock signal CLK by a variable delay amount, and the output signal of the first latch circuit 21 is processed as the received data.

In the exemplary embodiment of the invention, in order to synchronize the timings in the entire system, the transfer clock signal CLK(ExCLK) is transferred only to the partner device (2), and data transmission is performed mutually with the partner device (2) by synchronizing in common with the transfer clock signal CLK(ExCLK). Further, regarding the clock frequency of the transfer clock signal CLK(ExCLK), it is desirable to be set to the clock frequency which satisfies the required performance of the actual device so as not to deteriorate the data transfer throughput.

With the exemplary embodiment of the invention, it is possible to transfer the transfer clock signal CLK only to the partner device (2), to synchronize all data transfer with the transfer clock signal, and to synchronize the timing for latching the data inputted from the partner device with the clocks and the transfer timings of the entire system without depending on the wiring delay and the like. Specifically, it becomes possible to secure the margin of the setup time and hold time regardless of the delay time of data transfer through outputting the transfer clock signal CLK to the partner device (2) along with the transfer data and through inverting the edge of the clock signal used for data input on the partner device (2) side from the edge of the transfer clock signal used for the data transfer. Further, when transferring data from the partner device (2), it is possible to select the latch timing that is optimum for receiving the data. Thus, no matter what latch timing is selected, the same transfer tuning can be selected when the data is inputted from the data receiving section 500. This makes it possible to perform the synchronized data transfer regardless of the delay time of the data transfer. Therefore, pre-verification and board evaluation such as simulations can be performed equivalently with the actions of the actual device with the bit precision and cycle precision, so that it is expected to have increased verification precision.

Further, deterioration of the transfer throughput can be prevented since the clock frequency can be determined by considering the wiring delay of the actual device alone. Furthermore, the use of the phase variable clock signals makes it possible to obtain the basis for judging the latch timing with several times finer precision than the case the transfer clock. Therefore, it becomes possible to select the more optimum latch timing.

Next, the exemplary embodiment of the invention will be described in more details by referring to a specific example. A case of mounting the exemplary embodiment of the invention to the interfaces of the master slave LSI and the slave LSI will be described as a first exemplary embodiment. Further, as a second exemplary embodiment of the invention, described is a case of an interface circuit used under a condition where there are a plurality of slave LSIs and data transfer is performed among those slave LSIs by sharing a data bus signal. Moreover, a case where one of the slave LSIs according to the first exemplary embodiment and the second exemplary embodiment is connected by being put into a single chip as a slave core within the master LSI will be described as a third exemplary embodiment of the invention. At last, a case where the structure is simplified by limiting the interface with the slave LSIs to one kind will be described as a fourth exemplary embodiment of the invention.

FIRST EXEMPLARY EMBODIMENT

FIG. 1 is a block diagram showing the structure of the data transfer device according to the first exemplary embodiment of the invention. In following explanations of each of the exemplary embodiments, described is a case where the data transfer device according to the exemplary embodiments of the invention is mounted into the master LSI, and a slave LSI is used as the partner device.

The master LSI includes: flip-flops 10(FF(OH)), 11(FF(OL)), 20(FF(IH)), 21(FF(IL)), 22(FF(IM)), selecting circuits (selectors) 30, 31, a gate circuit 32, phase adjusting registers 40a(ADJREG0), 40b(ADJREG1), 40c(ADJREG2), - - -, input/output buffers 41, 43, 46, a delay register (DLY) 34, and a control processor (CPU) 100. Further, the slave LSI2 includes input/output buffers 42, 44, 45, flip-flops 50(FF(SDI)), 60(FF(SDO)), a PLL circuit 70, and an internal circuit 65 such as RAM and a logic circuit.

In the first exemplary embodiment shown in FIG. 1, the gate circuit 32 and the like form the clock sending section 400 which transmits the transfer clock signal CLK(ExCLK) to the partner device (slave LSI2). The clock sending section 400 may include the input/output buffer 43. Further, the first latch circuit of the data receiving section 500, which latches the data MDI at the rise edge or the fall edge of the delay clock signal DCLK that is delayed from the transfer clock signal CLK by a variable delay amount, is formed by the flip-flop 21. Furthermore, the second latch circuit which latches the data MDI at the rise edge or the fall edge of the transfer clock signal CLK is formed by the flip-flop 20. The data MDI is data that is transmitted to the master LSI1 as the data transfer device from the slave LSI as the partner device by synchronizing with the transfer clock signal CLK. A data output circuit 600 which outputs transmission data DO to the slave LSI2 as the partner device by synchronizing with the rise edge or the fall edge of the transfer clock signal CLK is formed by the flip-flop 10, the flip-flop 11, and the like. Note, however, that the structure of the data output circuit 600 is not limited to the one shown in FIG. 1.

Further, a first selecting section which selects, as the reception data, the output signal of the flip-flop 21 as the first latch circuit or the output signal of the flip-flop 20 as the second latch circuit is formed by the selecting circuit (selector) 30.

Furthermore, a third latch circuit which latches the data MDI outputted from the selecting circuit 30 as the first selecting section at the rise edge or the fall edge of the transfer clock signal CLK is formed by the flip-flop 22. Moreover, a second selecting section which selects, as the reception data, the output signal of the flip-flop 20 as the second latch circuit or the output signal of the flip-flop 22 as the third latch circuit is formed by the selecting circuit (selector) 31.

While the case where the latch circuits and the selecting sections are connected in multiple stages is described in the first exemplary embodiment shown in FIG. 1, the present invention is not limited only to such case. As the basic structure, the first exemplary embodiment may be achieved with the circuit structure where only the first latch circuit 21 is provided, as long as it is the structure which processes the output signal of the first latch circuit 21 as the received data. Further, as an applied case thereof, it is also possible to employ a structure in which the second latch circuit 20 is provided in addition to the first latch circuit 21, and the first selecting section 30 selects the output signal of the first latch circuit 21 or the output signal of the second latch circuit 20 in order to optimize the timing to latch the data MDI. Furthermore, it is also possible to employ a structure in which the third latch circuit 22 is provided in addition to the first latch circuit 21 and the second latch circuit 20, and the second selecting section 31 selects the output signal of the second latch circuit 20 or the output signal of the third latch circuit 22 as the reception data.

The flip-flop 10 latches the output data DO at the rise edge of the transfer clock signal CLK, and outputs it to the flip-flop 11. The flip-flop 11 latches the output data of the flip-flop 10 at the fall edge of the clock signal CLK, and transmits the output data MDO to the slave LSI2 via the input/output buffer 41. The bit width of the output data DO may be set as 1-bit width or may be set as plural-bit width as a data bus. It is illustrated as 1-bit width in this case. Further, there may also be other logic circuits, not shown, provided between the flip-flop 11 and the input/output buffer 41, etc.

Furthermore, the gate circuit 32 transmits the clock signal CLK to the slave LSI2 via the input/output buffer 43 as the clock signal ExCLK that is set on and off by a control signal CNT.

Further, the reception data from the slave LSI2 is inputted to the flip-flops 20 and 21 as the data MDI via the input/output buffer 46. The bit width of the reception data may be set as 1-bit width or may be set as plural-bit width as a data bus. It is illustrated as 1-bit width in this case. Further, there may also be other logic circuits, not shown, provided between the input/output buffer 46 and the flip-flops 20, 21, etc.

The flip-flop 20 latches the data MDI at the rise edge of the clock signal CLK, and outputs it to the selecting circuits 30 and 31 which are used for phase adjustment. The flip-flop 21 latches the data MDI at the rise edge of the phase-variable clock signal DCLK, and outputs it to the selecting circuit 30. The delay register 34 delays the clock signal CLK based on a set value DSET from the control processor 100, and outputs the clock signal DCLK. The selecting circuit 30 outputs the output signal of the flip-flop 20 to the flip-flop 22 when the selecting signal SEL0=1 and outputs the output signal of the flip-flop 21 to the flip-flop 22 when the selecting signal SEL0=0. The flip-flop 22 latches the output signal of the selecting circuit 30 at the rise edge of the clock signal CLK, and outputs it to the selecting circuit 31. The selecting circuit 31 outputs the output signal of the flip-flop 20 as the reception data DI when the selecting signal SEL1=1, and outputs the output signal of the flip-flop 22 as the reception data DI when the selecting signal SEL1=0.

The phase adjusting registers 40a, 40b, 40c, - - - fetch the reception data DI at the rise edge of the clock signal CLK by fetch permission signals EN0, EN1, EN2, - - -, respectively, which are transmitted from the control processor 100.

The control processor 100 controls selection of latch timings for acquiring the data synchronized with the transfer clock signal outputted to the partner device 2 as the reception data by changing the setting of the timings for the selecting sections to latch the data and changing the delay amount of the delay clock signal. Specifically, the control processor 100 outputs the control signal CNT to the gate circuit 32. At the same time, the control processor 100 reads out, as necessary, the values of the phase adjusting registers 40a, 40b, 40c, - - - at the time of phase adjustment, outputs the selecting signals SEL0, SEL1 in accordance with the readout result, and selects the latch timings of the flip-flops 20, 21, and 22. Further, the control processor 100 sets the setting value DSET which defines the delay amount of the delay register 34.

In the slave LSI2, the PLL circuit 70 receives the clock signal ExCLK as a clock signal REFCLK via the input/output buffers 43, 44, and outputs a reference clock signal CTS to the flip-flops 50, 60, and the internal circuit 65. When the clock signal REFCLK can be supplied stably, it is possible to eliminate the PLL circuit 70 and to take the clock signal REFCLK as the clock signal CTS.

The flip-flop 50 latches the output data MDO at the rise edge of the clock signal REFCLK as the data SDI via the input/output buffers 41, 42, and outputs it to the internal circuit 65 and the like. Further, there may also be other logic circuits, not shown, provided between the input/output buffer 42 and the flip-flop 50, etc.

The flip-flop 60 latches the data from the internal circuit 65 and the like at the rise edge of the clock signal REFCLK, and outputs it as the data MDI to the master LSI1 via the input/output buffers 45, 46. Further, there may also be other logic circuits, not shown, provided between the flip-flop 60 and the input/output buffer 45, etc.

FIG. 2 is an illustration showing the waveform-phase relationships regarding the clock signals CLK, DCLK, and ExCLK shown in FIG. 1. Note here that "f" in FIG. 2 indicates the frequency (unit: Hz) of the clock signal CLK. The clock signal CLK is a clock signal that is the basis of the transfer clock or the internal operation clock. Further, the clock signal DCLK is of the same frequency as that of the clock signal CLK, and it is the phase-variable clock whose phase can be changed by the setting value DSET of the delay register 34. In FIG. 2, the clock signal DCLK (DSET=0 to 3) that can be shifted to four phases is achieved by using and shifting a clock signal CLKH that has the frequency of four times as that of the clock signal CLK. However, it is not specifically limited to four phases, if it is the clock that is capable of selecting a plurality of phases. Further, the clock signal ExCLK has the same frequency and phase as those of the clock signal CLK, and it is an external transfer clock which can be set on and off by the signal CNT from the control processor 100 (off when CNT=0, on when CNT=1).

Actions of the data transfer device according to the first exemplary embodiment of the invention will be described by referring to FIG. 1. The clock signal CLK is used as the transfer clock of the master LSI side, and the clock signal ExCLK is outputted as the basis for the transfer clock for the slave LSI2. The slave LSI2 performs input and output of data transfer performed with the master LSI1 by synchronizing with the clock signal ExCLK.

When transferring the data from the master LSI1 to the slave LSI2, the master LSI1 side outputs (flip-flop 11) the transfer data by synchronizing with the fall edge of the clock signal CLK, and the slave LSI2 side latches (flip-flop 50) the data by synchronizing with the rise edge of the clock signal CTS whose phase is the same as that of the clock signal REFCLK. Further, inversely, as will be described later in a fourth exemplary embodiment shown in FIG. 12, it is also possible to employ a structure in which the master LSI1 side outputs the transfer data by synchronizing with the rise edge, and the slave LSI2 side latches the transfer data by synchronizing with the fall edge. That is, it is the structure in which the slave LSI2 side latches the input data by using a clock edge that is the opposite from the clock edge used for the output data on the master LSI1 side.

When transferring the data from the slave LSI2 to the master LSI1, the slave LSI2 side outputs the data by synchronizing with the rise edge of the clock signal CTS, and the master LSI1 side latches the data by synchronizing with both the rise edge and the fall edge of the clock signal CLK. That is, the data is latched by synchronizing with the rise edge through using the flip-flop 20, and latched by synchronizing with the fall edge through using the phase-variable clock signal DCLK and the flip-flop 21. For example, when the flip-flop 21 is a flip-flop which operates at the rise of the clock signal DCLK, the setting value DSET of the clock signal DCLK is set to "2" so that the phase of the clock signal DCLK becomes the inverted phase from that of the clock signal CLK. Further, when transferring the input data DI to the internal circuit, an optimum method is selected from the following three transfer methods according to the delay time between the LSIs.

The first transfer method is a method which re-latches (flip-flop 22), at the rise edge, the data that has already been latched (flip-flop 20) at the rise edge of the clock signal CLK, and transfers the data (SEL1=0, SEL0=1). This method is selected in a case where the two-way (round-trip) delay time for transferring the data between the master slave LSI and the slave LSI is within 1 cycle of the transfer clock.

The second transfer method is a method which re-latches (flip-flop 22), at the rise edge of the clock signal CLK, the data that has already been latched (flip-flop 21) at the fall edge of the clock signal CLK, i.e., the rise edge of the clock signal DCLK, and transfers the data (SEL1=0, SEL0=0). This method is selected in a case where the two-way (round-trip) delay time for transferring the data between the master slave LSI and the slave LSI is between 0.5 cycle and 1.5 cycle of the transfer clock.

The third transfer method is a method which transfers the data latched (flip-flop 20) at the rise edge of the clock signal CLK as it is (SEL1=1, SEL0=1). This method is selected in a case where the two-way (round-trip) delay time for transferring the data between the master slave LSI and the slave LSI is between 1 cycle and 2 cycle of the transfer clock.

FIG. 3, FIG. 4, and FIG. 5 are charts which show the transfer timings in the cases of the first, second, and third methods, respectively. Note here that "f" indicates the frequency (unit: Hz) of the transfer clock, "TCLK" indicates the delay time of the transfer clock from the master LSI1 to the slave LSI2, and "TDSM" indicates the delay time of the transfer data from the slave LSI2 to the master LSI1. The delay time between the LSIs is the time which includes all of the operation delay and the like of the circuits, wiring delay, and the input/output buffers existing between the flip-flops.

Data transfer from the master LSI1 to the slave LSI2 is done by the same actions in FIG. 3-FIG. 5 regardless of the delay time between the LSIs. In the exemplary embodiment of the invention, the transfer clock signal is outputted from the master LSI1 to the slave LSI2, and the delay time TCLK of the clock signal and the delay time TDMS of the transfer data increase and decrease almost in a same proportion even when there is a change in the wiring delay. Therefore, the relation in regards to the timings of the input data and the clock signal on the slave LSI2 side becomes almost constant. Further, the master LSI1 side outputs the transfer data by synchronizing with the fall edge of the clock signal (with delaying of 0.5 cycle). This makes it possible to secure the margins of both the setup time and the hold time for the input-data flip-flop 50 on the slave LSI2 side as 0.5 cycle (½f sec) of the transfer clock. Therefore, it is possible to achieve secured synchronous transfer in 1 cycle regardless of the delay time between the LSIs.

For data transfer from the slave LSI2 to the master LSI1, the transfer method corresponding to one of the cases shown in FIG. 3-FIG. 5 is selected according to the delay time between the LSIs. In a case where the sum of the delay time TCLK of the clock signal from the master LSI1 to the slave LSI2 and the delay time TDSM of the transfer data from the slave LSI2 to the master LSI1 (TCLK+TDSM: two-way delay time between the LSIs) is within 1 cycle of the clock signal, the control of the selecting circuits 30 and 31 is set to "SEL1=0 and SEL0=1" on the master LSI1 side, as shown in FIG. 3. In this case, the data latched (flip-flop 20) by synchronizing with the rise edge of the clock signal CLK is re-latched (flip-flop 22) at the rise edge, and it is transferred to the internal circuit as the data DI.

In a case where the two-way delay time "TCLK+TDSM" between the LSIs is between 0.5 cycle and 1.5 cycle of the transfer clock, the control of the selecting circuits 30 and 31 is set to "SEL1=0 and SEL0=0", as shown in FIG. 4. In this case, the data latched (flip-flop 21) by synchronizing with the fall edge of the clock signal CLK (rise edge of the clock signal DCLK) is re-latched (flip-flop 22) by synchronizing with the rise edge of the clock signal CLK, and it is transferred to the internal circuit as the data DI.

Further, in a case where the two-way delay time "TCLK+TDSM" between the LSIs is between 1 cycle and 2 cycle of the transfer clock, the control of the selecting circuits 30 and 31 is set to "SEL1=1 and SEL0=1", as shown in FIG. 5. In this case, the data latched (flip-flop 20) by synchronizing with the rise edge of the clock signal CLK is transferred as it is to the internal circuit as the data DI.

Through performing the selection controls of the selecting circuits 31 and 30 on the master LSI1 side by corresponding to the two-way delay time between the LSIs in the manner described above, it becomes possible to transfer the data of various input timings to the internal circuit by synchronizing with a specific timing (DI in FIG. 3-FIG. 5).

The exemplary embodiment has been described by referring to the case of selecting the optimum transfer method from the three transfer methods. However, the present invention is not limited only to such case. It is also possible to employ a structure which can correspond to a case where the two-way delay time "TCLK+TDSM" between the LSIs is between 1.5 cycle and 2.5 cycle or a case where the two-way delay time is between 2 cycle and 3 cycle, through adding more flip-flops, selecting circuits, and the like required for latter stages, which operate by synchronizing with the rise edge or the fall edge of the clock signal CLK when generating the data DI for the internal circuit of FIG. 1.

Next, a phase adjusting method will be described. For transferring data from the slave LSI2 to the master LSI1, the master LSI side prepares a phase adjusting mode for selecting the optimum latch timing of the input data. Through setting the phase adjusting mode to be on, i.e., through activating fetching permission signals EN0, EN1, EN2, - - - , the latched and selected input data DI can be stored in order into the phase adjusting registers 40a, 40b, 40c, - - - shown in FIG. 1. When the phase adjusting mode is set to be off, the clock signal used for phase adjusting register may be stopped by clock-gating in order to save the power consumption.

FIG. 6 is a chart showing an example of a sequence of the phase adjusting method according to the exemplary embodiment of the invention. A CPU executes processing of each phase according to the order shown in FIG. 6. The phase adjusting mode is set on in phase (A), and the setting of the selecting circuits 30, 31 (output of signals SEL0, SEL1) and the phase of the phase-variable clock signal DCLK are changed (setting of DSET) in phases (B) and (C). Further, a data read request and a data transfer request are made to the slave LSI2 from the master LSI1 side in phase (D). In response to the request, desired data is transferred to the master LSI1 from the slave LSI2 in phase (E). Thereby, the input data DI is latched to the phase adjusting registers 40a, 40b, 40c, - - -, and the latched value is checked in phase (F).

The processing from the phase (B) to the phase (F) is repeated for the number of combinations of phase-adjusting settings, and the latch timing of which setting combination is the optimum timing is judged in phase (G).

FIG. 7 is a chart showing the phase adjustment setting combinations and the latch timings according to the data acquiring judgment results (OK/NG) which are obtained based on the setting combinations. The latch timings (1), (2), and (3) in FIG. 7 correspond to the latch timings shown in FIG. 3, FIG. 4, and FIG. 5, respectively. Further, through the use of the 4-phase variable clock as in FIG. 2 for the phase-variable clock signal DCLK, it becomes possible to obtain the judgment data at the intermediate timings such as (4) and (5) by setting the setting value DSET of the clock signal DCLK as "1" or "3".

In the case of the exemplary embodiment, the sequence from phases (B)-(F) shown in FIG. 6 is repeated for the combinations of (1)-(5) shown in FIG. 7. Then, the setting combination whose data acquiring judgment result is "OK" is selected from (1)-(3) as the optimum latch timing. However, when there are two or more setting combinations whose judgment result is "OK" in (1)-(3), the setting combination whose judgment results on both neighboring phases are also "OK" (to be apart as much as possible from the phase timing whose judgment result becomes "NG") is selected as the more appropriate latch timing by considering the judgment results at the intermediate latch timings of (4) and (5) as well.

The result of selection of the optimum latch timing obtained in advance in accordance with operating environment such as on the evaluation board or the actual device is set in a fixed manner as the selecting values of the selecting circuits 30 and 31 before transferring the data between the LSIs in the actual operation. It is also possible to employ a system in which the control processor 100 autonomously conducts selection and setting of the optimum latch timing when starting the system in the actual operation. Further, through outputting the data acquiring judgment results at each latch timing (results of OK/NG judgments shown in FIG. 7) to the outside the LSIs from the control processor 100, a rough estimate (actually measured value) of the delay time between the LSIs in the operating environment such as on the evaluation board or the actual device can be observed on the outside of the LSIs with a fine precision.

Next, a data return mechanism for the phase adjusting mode will be described. When adjusting the phase with the phase adjusting mode, it may happen that the transfer data cannot be acquired properly depending on the setting combination. Therefore, on the phase (D) of the phase adjusting sequence shown in FIG. 6, for example, when the master LSI1 transmits a read request to the slave LSI2 and the judgment results is "NG", it may happen that the read data and the corresponding control signal cannot be returned properly, so that the control processor 100 may operate abnormally, e.g., the control processor 100 may freeze.

FIG. 8 is a chart showing a mounting example of a data return circuit which prevents system shutdown even in a case where the data cannot be acquired at a desired timing with the phase adjusting mode. In a case where the control processor 100 on the master LSI1 side waits for the control signals (WAIT signal, READY signal, INTERRUPT signal, etc.) based on the transfer data from the slave LSI2 at the time of the phase adjusting mode, there is provided a circuit which generates the corresponding control signals even if an interface circuit 200 (the structural components within the master LSI1 of FIG. 1 except the control processor 100) cannot acquire the transfer data from the slave LSI2 properly. Specifically, mounted is a pseudo return signal generating circuit 110 which operates only when the phase adjusting mode is on.

Through mounting such return signal generating circuit 110, it becomes possible to prevent the control processor 100 from freezing and operating in an abnormal way. Further, through providing the return signal generating circuit 110 with a function which can grasp the judgment result (OK/NG) such as conversion of read data value, it becomes possible to judge the optimum latch timing without the use of the phase adjusting registers 40a, - - -.

Following effects can be expected with the use of the data transfer device described above.

The first effect is that it is possible to achieve data synchronous transfer between the LSIs with the cycle precision regardless of the difference in the delay time between the LSIs such as delay time on the evaluation board and the actual device, i.e., it is possible to synchronize the timing of the entire system.

The reason is as follows. The exemplary embodiment of the invention is so structured that data transfer between the LSIs is conducted by synchronizing with the common clock signal transferred from the master LSI to the slave LSI direction and, for data transfer from the master LSI to the slave LSI, the slave LSI side latches the input data by using a click edge that is inverted from a clock edge used for outputting the data on the master LSI side. Thus, the margin of the setup time and the hold time can be secured regardless of the delay time between the LSIs. Further, regarding data transfer from the slave LSI to the mater LSI, the master LSI side is provided with a mechanism which can select a plurality of latch timings (rise edge, fall edge, rise edge with 1-cycle delay, etc.) for the data outputted from the slave LSI side by synchronizing with the rise edge or the fall edge of the transfer clock of the slave LSI. This makes it possible to form the data input circuit with the data can be transferred to the internal circuit of the master LSI side at the same transfer timing at all times no matter which of the latch timings is selected regardless according to the delay time between the LSIs.

Further, since the timings in the entire system can be synchronized, it is possible to perform operation verification in the pre-verification and board evaluation such as simulations equivalent to that on the actual device with bit precision and cycle precision. Therefore, it is also expected to have high verification precision.

The second effect is that it is possible to select the transfer clock frequency assuming the data synchronous transfer between the LSIs on the actual device, so that the deterioration of the transfer throughput can be prevented.

The reason is as follows. In the exemplary embodiment of the invention, the master LSI outputs the transfer clock along with the transfer data to the slave LSI, so that the optimum latch timing can be selected when transferring the data from the slave LSI to the master LSI. Therefore, even when the two-way delay time between the LSIs becomes 1 cycle or more, the data can be transferred between the LSI properly. Thus, when the transfer clock frequency, the transfer data bit width, and the like are determined assuming the case of the actual device and the like, it is not necessary to consider the delay time between the LSIs on the evaluation board and the like in a strict manner.

The third effect is that it is possible to select the more optimum latch timing because the margin is secured as much as possible, so that the stable data transfer can be achieved between the LSIs.

The reason is as follows. In the exemplary embodiment of the invention, the data acquired result obtained at the timing between each of the latch timings is also utilized when judging the optimum latch timing (at the time of phase adjustment), through using the phase-variable clock that is capable of changing the phase with a finer precision compared to the combination of the latch timings (rise edge, fall edge, and the like of the transfer clock). Further, the rough estimate of the delay time between the LSIs can be observed with fine precision through monitoring the judgment results at each phase timing on the outside of the LSIs by using the phase-variable clock with a finer precision than that of the latch timing. Furthermore, it is possible to test the adequacy of the current transfer clock frequency from the extent of the time margin and the like, and to feed back the possibility of improving the transfer clock frequency to developments of the next system.

The fourth effect is that the circuit implementability is high on the maser LSI side as well as the slave LSI side, and designing and manufacturing thereof are extremely easy.

The reason is as follows. The synchronous circuit and the phase adjusting circuit between the LSIs according to the exemplary embodiment of the invention can be implemented only with the use of a combination of a typical flip-flop device and a selector circuit, and the phase adjustment is conducted by the control processor by means of a program. Thus, it is unnecessary to use a complicated circuit mechanism such as a clock data recovery circuit which uses a feedback loop and a special delay device. Further, through employing the structure shown in the first exemplary embodiment and the third exemplary embodiment described later for the data input circuit of the master LSI side, the internal circuit can be designed without minding the phase setting of the phase-variable clock.

Furthermore, there is also such an advantage especially on the slave LSI side that the expandability and versatility are high. This is because the exemplary embodiment can be implemented only with the circuit structure which synchronizes with the rise edge of all the transfer clocks without requiring any specific devise on the circuit specialized in the present invention. Moreover, there is also such a large advantage that it is easy to correspond to an idea of putting the slave LSI into a single chip with the master LSI as the entire system in the future. As will be described later in the third exemplary embodiment, it is because the circuit modification when the LSIs are put into a single chip can be done relatively easily, and the equivalence in the verifications and operations can be guaranteed since there is no change in the timings in the entire system for the case where the slave core is separately put into a chip as an LSI and a case where the slave is put into a single chip with the master LSI.

EXAMPLE 1

FIG. 9 shows a case where the data transfer device according to the first exemplary embodiment of the invention shown in FIG. 1 is applied to a W-CDMA (Wideband Code Division Multiple Access) digital base band (DBB) LSI system having an HSDPA (High Speed Downlink Packet Access) function expansion which is one of examples of an accelerator expansion system that uses a plurality of LSIs.

The WCDMA DBB LSI as a master LSI1a is provided with: a processor (CPU) 100a for controlling the entire W-CDMA digital base band LSI system; a clock control circuit 300 (CLK Ctrl); and bus controller circuits 201, 202 (BUSC1, BUSC2) which conduct data transfer with a slave LSI2a. The clock control circuit 300 supplies a clock signal CLK used for transfer and a clock signal DCLK used for phase adjustment to the bus controller circuits 201, 202. Further, the HSDPA DBB LSI as a slave LSI2a is provided with: bus interface circuits 203, 204 (BUSIF1, BUSIF2) which conduct data transfer with the master LSI1a; a PLL circuit 70 which generates a clock signal CTS used for internal operations based on a clock signal REFCLK which is transmitted from the master LSI1a; and an internal circuit 65 which is formed with a RAM and a logic circuit. The master LSI1a outputs, to the slave LSI2a, an external clock signal ExCLK used for system synchronization, which becomes the clock signal REFCLK within the slave LSI2a.

Data transfer between the master LSI1a and the slave LSI2a is achieved by bus transfer using a data bus signal of 4-bit width, for example, and there are two kinds depending on the usages. Note here that the inter-LSI synchronous circuit and the phase adjusting circuit (corresponds to the structural components in FIG. 1 except the control processor 100, the PLL circuit 70, and the internal circuit 65) as the first exemplary embodiment of the invention shown in FIG. 1 are mounted to the closest area of the input/output terminals of the LSIs both in the bus controller circuits 201, 202 (BUSC1, BUSC2) within the master LSI1a and in the bus interface circuits 203, 204 (BUSIF1, BUSIF2) within the slave LSI2a. Further, the relationship regarding the timings of the clock signals CLK, DCLK, and ExCLK is as shown in FIG. 2, and the clock signal DCLK is a phase-variable clock of four phases.

Through transferring the clock signal ExCLK from the master LSI1a to the slave LSI2a and operating the slave LSI2a by synchronizing with the clock signal, it becomes easy to establish timing synchronization as the entire system, which is important as a communication system. The main communication between the master LSI1a and the slave LSI2a is conducted by using the bus controller circuits 201, 202 (BUSC1, BUSC2) on the master LSI1a side as well as the bus interface circuits 203, 204 (BUSIF1, BUSIF2) on the slave LSI2a side to which the inter-LSI synchronous circuit is mounted. Specifically, conducted thereby are writing and reading of control information data, burst transfer of transmission/reception data, etc. Further, the phase adjusting circuit is mounted to each of the bus controller circuits 201, 202 (BUSC1, BUSC2) on the master LSI1a side, and selection setting of the optimum latch timing is done for each of the buses. Therefore, it is possible to achieve synchronous data transfer at all times regardless of the wiring delay differences between the LSIs on the evaluation board and the actual device, etc.

SECOND EXEMPLARY EMBODIMENT

FIG. 10 is a block diagram showing the structure of a data transfer device according to a second exemplary embodiment of the invention. The second exemplary embodiment shown in FIG. 10 is structured in such a manner that a data output circuit 600 transfers transfer data to a plurality of partner devices 2 via a common data bus DB, and a data receiving section 500 selects the latch timing based on which partner device out of the plurality of the partner devices is using the data bus DB. In the case shown in FIG. 10, the data output circuit 600 is formed with flip-flops 10, 11, and the like. Further, the data receiving section 500 is formed in the same manner as the one shown in FIG. 1. Furthermore, a clock sending section 400 is formed with gate circuits 32a, 32b, and the like. The clock sending section 400 may include input/output buffers 43a and 43b.

Hereinafter, the second exemplary embodiment of the invention will be described in a specific manner. In FIG. 10, the same reference numerals as those of FIG. 1 indicate the same structural components, and explanations thereof are omitted. In the data transfer device of FIG. 10, there are a plurality of slave LSIs (two slaves LSI2b, 2c in FIG. 10), and data transfer is conducted with the master LSI1b by sharing bidirectional data bus signal between the slave LSIs.

In FIG. 10, as the input/output buffers 41, 46 of FIG. 1, the master LSI1b includes an input/output buffer 47a which interfaces with the bidirectional data bus capable of input and output, which is common to the slaves LSI2b and 2c. The output buffer function of the input/output buffer 47a is activated by an enable signal OEN. Further, the master LSI1b includes gate circuits 32a and 32b which are controlled to be on/off by signals CNT1 and CNT2, respectively. Furthermore, a clock signal ExCLK1 outputted from the gate circuit 32a is outputted to the slave LSI2b via the input/output buffer 43a. A clock signal ExCLK2 outputted from the gate circuit 32b is outputted to the slave LSI2c via the input/output buffer 43b. For the clock signals. ExCLK1 and ExCLK2, the frequency and the phase thereof become the same as those of the clock signal CLK when the gate circuits 32a and 32b are on, respectively.

A control processor 100b outputs the control signals CNT1 and CNT2 to the gate circuit 32a and 32b, respectively. Further, the control processor 100b reads out the values of the phase adjusting registers 40a, 40b, 40c, - - - at the time of phase adjustment, and outputs selection signals LSI1_SEL0, LSI1_SEL1, LSI2_SEL0, or LSI2_SEL1 to a selecting circuit 33 according to the readout result. An arbiter 120 outputs, to the selecting circuit 33, a selection signal Slave2_GRANT which shows whether or not to set the latch timing of data outputted from the slave SLI2b or 2c. The selecting circuit 33 outputs the selection signals LSI1_SEL0, LSI1_SEL1 to the selecting circuits 30, 31 as the selection signals SEL0, SEL1, respectively, when the Slave2_GRANT=0, and outputs the selection signals LSI2_SEL0, LSI2_SEL1 to the selecting circuits 30, 31 as the selection signals SEL0, SEL1, respectively, when the Slave2_GRANT=1. That is, selection of latch timing in the flip-flops 20, 21, and 22 is conducted by the selection signals LSI1_SEL0, LSI1_SEL1 or the selection signals LSI2_SEL0, LSI2_SEL1 based on the selection signal Slave2_GRANT. Note here that it is also possible to employ a structure in which the selection signal Slave2_GRANT is outputted not from the arbiter 120 but from the control processor 100b.

Each of the slaves LSI2b and 2c includes the input/output buffers 42, 45 shown in FIG. 1 as input/output buffers 47b, 47c which interface with the bidirectional data bus. As in the master LSI1b side, there is an output enable signal OEN for controlling the input/output buffers of the bidirectional data bus signal. Further, as in FIG. 1, there are a data-input flip-flop 50 and a data-output flip-flop 60, which operate at the rise edge of the clock signal transferred from the master LSI1b side. Furthermore, there may also be a PLL circuit 70 which operates by referring to the phase of the transfer clock signal REFCLK from the master LSI side for generating the transfer clock and the internal operation clock of the slave LSI side. While FIG. 10 illustrates a case where the two slave LSIs are connected, the present invention can also be applied to a case where there are three or more slave LSIs.

Operation of the data transfer device according to the exemplary embodiment will be described by referring to FIG. 10. As in the case of the first exemplary embodiment, the clock signal CLK is used as the transfer clock of the master LSI1b side, and the clock signals ExCLK1, EXCLK2 are outputted, respectively, as the references of the transfer clocks for the slave LSI2b and the slave LSI2c. As the transfer clock signal for the slave LSIs, it is possible to separately control and output' the signals such as the clock signals ExCLK1, ExCLK2 for each slave LSI, or to output the signal in common as the clock signal ExCLK. As in the case of the first exemplary embodiment, the slave LSI side performs input and output of data transfer with the master LSI by synchronizing with the clock signals ExCLK1 and ExCLK2.

When transferring data from the master LSI to the slave LSI, the master LSI1b side outputs (flip-flop 11) the transfer data by synchronizing with the fall edge of the clock signal CLK, and the slaves LSI2b and 2c side latch (flip-flop 50) the data by synchronizing with the rise edge of the transfer clock, as in the case of the first exemplary embodiment. In a case where the data bus signal is used in common by a plurality of slave LSIs as in FIG. 10, it is also possible to employ a circuit structure and actions with which an individual control signal indicating which slave LSI the access is made to is outputted along with the data bus signal, and the slave LSI side judges whether or not to latch the data bus signal based on the control signal. Further, when outputting the bidirectional data bus signal, the output enable signal OEN on the master LSI side is set to active. Through outputting the transfer data with timing delay of 0.5 cycle when outputting the transfer data from the master LSI as in the case of the first exemplary embodiment, secure synchronous transfer in 1 cycle can be achieved regardless of the delay time between the LSIs.

When transferring the data from the slaves LSI2b and 2c to the master LSI1b, the slave LSI side outputs (flip-flop 60) the data by synchronizing with the rise edge of the clock signal, and the master LSI1 side latches (flip-flops 20, 21) the data by synchronizing with both the rise edge and the fall edge of the clock signal CLK, as in the case of the first exemplary embodiment. Further, when transferring the input data DI to the internal circuit, the optimum method is selected from the three transfer method shown in the first exemplary embodiment in accordance with the delay time between the LSIs. In a case where the bidirectional data bus signal is used in common by a plurality of slave LSIs, only one of the slave LSIs outputting the data sets the output enable signal OEN to be active. Further, when selecting the optimum method from the three transfer method on the master LSI side, it is possible that the delay time between the LSIs varies with each slave LSI. Thus, the output values (SEL1, SEL0) of the selecting circuit 33 are switched by using the value of the selection signal Slave2_GRANT that indicates which slave LSI is using the data bus.

As described above, the circuit structure is so designed that the selecting circuits 30, 31 on the master LSI1b side are selection-controlled in accordance with the two-way delay time between the LSIs and the values thereof can be switched for each slave LSI. Such circuit structure makes it possible to transfer the data to the internal circuit by synchronizing with a constant timing (DI timing of the data DI in FIG. 3-FIG. 5) for various input data timings from a plurality of slave LSIs.

Next, the phase adjusting method will be described. For transferring data from a given slave LSI to the master LSI, the phase adjusting method for the master LSI side to select the optimum latch timing of the input data is the same as that of the first exemplary embodiment.

However, in the case of the second exemplary embodiment, the optimum latch timing is obtained for each slave LSI by individually performing phase adjustment for a plurality of slave LSIs to be connected. The phase adjustment values (LSI1_SEL[1:0], LSI2_SEL[1:0] in FIG. 10) are set according to the obtained result.

Third Exemplary Embodiment

FIG. 11 is a block diagram showing the structure of a data transfer device according to a third exemplary embodiment of the invention. The third exemplary embodiment shown in FIG. 11 includes an in-device transfer section 5 which receives a transfer clock signal and transfers data synchronized with the received transfer clock signal. Further, a data receiving section 500 further includes cascade-connected fifth and sixth latch circuits which latch the data from the in-device transfer section 5 by synchronizing with the transfer clock signal CLK, and the data receiving section 500 acquires the output signal of the sixth latch circuit as the reception data. In the case of FIG. 11, the fifth latch circuit is formed with a flip-flop 20a, and the sixth latch circuit is formed with a flip-flop 22a.

Hereinafter, the third exemplary embodiment of the invention will be described in a specific manner. In FIG. 11, the same reference numerals as those of FIG. 10 indicate the same structural components, and explanations thereof are omitted. The data transfer device shown in FIG. 11 is a case where one of the slave LSIs is connected by being put into a single chip within a master LSI1c as a slave core 5. The slave core 5 corresponds to the in-device transfer section.

Differences between FIG. 1 showing the data transfer device according to the first exemplary embodiment as well as FIG. 10 showing the data transfer device according to the second exemplary embodiment and FIG. 11 showing the data transfer device according to the third exemplary embodiment will be described. When one of the slave LSIs is put into a single chip within the mater LSI1c as the slave core 5, a transfer clock signal CLK2 is connected directly to the slave core 5. Further, for outputting transfer data from a master core 4 to the slave core 5, there are a flip-flop 10 which operates at the rise edge of the clock signal CLK and a flip-flop 11 which operates at the fall edge of the clock signal CLK. The output data MDO is taken directly as input data SDI of the slave core 5 side. In this case, it becomes possible to guarantee the synchronous transfer between clock signal CLK within the master core 4 and the clock signal CLK within the slave core 5 in the effect of employing "single-chip" structure. Therefore, the transfer data synchronizing with the flip-flop 10 which operates at the rise edge of the clock signal CLK can be directly connected to the slave core 5 side without using the flip-flop 11 which operates at the fall edge of the clock signal CLK.

Similarly, for transferring data form the slave core 5 to the master core 4, phase adjustment (selection of the optimum latch timing) on the master core 4 side becomes unnecessary since the synchronous transfer is guaranteed. Thus, on the master core 4 side, there are only flip-flops 20a (FF(IH2)) and 22a (FF(IM2)) which are connected in series and operate at the rise edge of the clock signal CLK, and the input data MDI2 latched once by the flop-flop 20a is re-latched by the flip-flop 22a to be transferred to the internal circuit.

Through employing such structure, it becomes possible to achieve data transfer at the same transfer timing whether the slave core 5 is connected by being put into a single chip within the master LSI1c or it is connected by being put into another chip as the slave LSI2b. When it is put into a single chip as the slave core 5, the transfer timing becomes the same as the case of selecting the first transfer method shown in FIG. 3. As shown in FIG. 11, when there a plurality of slave cores 5 and slaves LSI1b, an arbiter 120a outputs a selection signal Slave2_GRANT2 to the selecting circuit 35, and determines the final data DI outputted to the internal circuit depending on which slave is making an access. That is, when the selection signal Slave2_GRANT2=0, data from the slave LSI2b is outputted to the internal circuit as the data DI. When the selection signal Slave2_GRANT2=1, data from the slave core 5 is outputted to the internal circuit as the data DI. Note here that it is also possible to employ a structure in which the selection signal Slave2_GRANT2 is outputted not from the arbiter 120a but from a control processor, not shown, or the like.

FOURTH EXEMPLARY EMBODIMENT

FIG. 12 is a block diagram showing the structure of a data transfer device according to a fourth exemplary embodiment of the invention. In the fourth exemplary embodiment shown in FIG. 12, a data receiving section 500 includes: a fourth latch circuit 22 which latches the output signal of a first latch circuit 21 at the rise edge or the fall edge of the transfer clock signal CLK; and a third selecting section 31 which selects the output signal of the fourth latch circuit 22 as the reception data. In the fourth exemplary embodiment, the first latch circuit 21 is formed with a flip-flop, the fourth latch circuit is formed with the flip-flop 22, and the third selecting section is formed with the selecting circuit (selector) 31.

Hereinafter, the fourth exemplary embodiment of the invention will be described in a specific manner. In FIG. 12, the same reference numerals indicate the same structural components as those of FIG. 1, and explanations thereof are omitted. The data transfer device of FIG. 12 shows a case where the structure is simplified since the interface with the slave LSIs can be limited to one kind.

On a master LSI1d side, there is a flip-flop 10 which operates at the rise edge of the clock signal CLK used for outputting the transfer data. For inputting transfer data, there are the flip-flop 21 which operates at the rise edge or the fall edge of the phase-variable clock signal DCLK and the flip-flop 22 which operates at the rise edge of the clock signal CLK. Further, there is the selecting circuit 31 which selects the outputs of the flip-flops 21, 22.

On the slave LSI2d side, there are a data-input flip-flop 51 (FF(SDIL)) which operates at the fall edge of the clock signal ExCLK transferred from the master LSI1d side, and a data-input flip-flop 50 (FF(SDI)) which operates at the rise edge of the clock signal ExCLK. Further, there is also a data-output flip-flop 60 (FF(SDO)) which operates at the rise edge of the clock signal ExCLK. For generating the transfer clock and the internal operation clock on the slave LSI2d side, there may also be a PLL circuit which operates by referring to the phase of the clock signal REFCLK from the master LSI1d side.

Differences with respect to FIG, 1 which shows the first exemplary embodiment are: the flip-flop 11 becomes unnecessary on the master LSI1d side; there is the flip-flop 51 on the slave LSI2d side; and the flip-flop 20 and the selecting circuit 30 are unnecessary on the master LSI1d side.

Operations of the data transfer device according to the fourth exemplary embodiment will be described by referring to FIG. 12. When transferring the data from the master LSI1$d$ to the slave LSI2$d$, the master LSI1$d$ side outputs (flip-flop 10) the transfer data by synchronizing with the rise edge of the clock signal CLK, and the slave LSI2$d$ side latches (flip-flop 51) the data by synchronizing with the fall edge of the clock signal REFCLK. As described in the first exemplary embodiment, this indicates that it is important to latch the input data on the slave LSI side by using the inverse clock edge with respect to the clock edge used on the mater LSI side for outputting the data, and that this applies both to the first exemplary embodiment and the fourth exemplary embodiment.

When transferring the data from the slave LSI2$d$ to the master LSI1$d$, the slave LSI2$d$ side outputs the data by synchronizing with the rise edge of the clock signal, and the master LSI1$d$ side latches (flip-flop 21) the data by synchronizing with the rise edge or the fall edge of the clock signal DCLK. Further, when transferring the input data DI to the internal circuit, an optimum method is selected from the following transfer methods, which are equivalent to the three transfer methods shown in the first exemplary embodiment, according to the delay time between the LSIs.

The first transfer method is a method which re-latches (flip-flop 22), at the rise edge, the data that has already been latched at the rise edge of the clock signal CLK, and transfers the data (DSET=0, SEL1=0) (equivalent to FIG. 3).

The second transfer method is a method which re-latches (flip-flop 22), at the rise edge of the clock signal CLK, the data that has already been latched at the fall edge of the clock signal CLK, i.e., the rise edge of the clock signal DCLK, and transfers the data (DSET=2, SEL1=0) (equivalent to FIG. 4).

The third transfer method is a method which transfers the data latched at the rise edge of the clock signal CLK as it is (DSET=0, SEL1=1) (equivalent to FIG. 5).

With the fourth exemplary embodiment, the phase of the clock signal DCLK can be set individually for each interface at the time of the actual operation. Therefore, the data-input flip-flop 20 and the selecting circuit 30 on the master LSI side shown in the first exemplary embodiment become unnecessary, so that the circuit structure can be simplified. However, this is a structure suited for a case where there is one kind of interface circuit between the LSIs. Thus, when there are a plurality of interface circuits between the LSIs as in EXAMPLE 1 (FIG. 9), it is necessary to have a plurality of clock signals DCLK which can be set individually for each interface. In the meantime, in a case of the structure which uses the data-input flip-flop 20 and the selecting circuit 30 on the master LSI side as shown in the first exemplary embodiment (FIG. 1), the phase-variable clock signal DCLK at the time of actual operation is set to be in a fixed phase. Therefore, even when there are a plurality of interfaces between the LSIs and the optimum latch timings vary for each interface, it is possible to use one kind of clock signal DCLK in common. Thus, this is considered a highly versatile structure.

Further, in the case of the fourth exemplary embodiment, a data path which synchronizes with the rise or fall of the clock signal DCLK is also included in the paths to the transfer data DI for the internal circuit of the master LSI side. Therefore, it is desired for the internal circuit to be designed so as to satisfy the setup time and hold time considering all the phases of the clock signals DCLK. In the meantime, in the case of the first exemplary embodiment, the data input circuit on the master LSI side is formed in the structure as in FIG. 1, so that the data DI for the internal circuit is outputted as the data path which necessarily synchronizes with the rise edge of the clock signal. Therefore, there is such an advantage that it is possible to design the internal circuit on the basis of the transfer data input synchronized with the rise edge of the clock signal regardless of the phase setting of the clock signal DCLK.

Next, another exemplary embodiment of the invention will be described. The data transfer device according to another exemplary embodiment of the invention includes: a clock sending section which transmits a transfer clock signal to a partner device; and a data receiving section which receives data synchronized with the transfer clock signal from the partner device. The data receiving section may include: a first latch circuit which latches data at the rise edge or the fall edge of a delay clock signal that is delayed from the transfer clock signal by a prescribed amount; and a selecting section which is structured to be capable of selecting the output signal of the first latch circuit as reception data.

In the data transfer device according to this another exemplary embodiment of the invention, the data receiving section may further include a second latch circuit which latches the output signal of the first latch circuit at the rise edge or the fall edge of the transfer clock signal, and the selecting section may be structured to be able to further select the output signal of the second latch circuit as the reception data.

In the data transfer device according to another exemplary embodiment of the invention, the data receiving section may further include a third latch circuit which latches the data at the rise edge or the fall edge of the transfer clock signal, and the selecting section may be structured to be able to further select the output signal of the third latch circuit as the reception data.

In the data transfer device according to this another exemplary embodiment of the invention, the selecting section may include: a first selecting circuit which selects the output signal of the first latch circuit and the output signal of the third latch circuit; a second latch circuit which latches the selection result of the first selecting circuit; and a second selecting circuit which selects the output signal of the second latch circuit and the output signal of the third latch circuit.

The data transfer device according to this another exemplary embodiment of the invention may include a control processor which selects the latch timing by having the partner device output the data and by acquiring the reception data while changing a prescribed amount and the setting for selecting the latch timing in the selecting section.

The data transfer device according to this another exemplary embodiment of the invention may include a phase adjusting register which stores reception data, and the control processor may select the latch timing by reading out the value of the phase adjusting register at the time of phase adjustment.

The data transfer device according to this another exemplary embodiment of the invention may include a return signal generating circuit which generates a signal for preventing an abnormal action at the time of phase adjustment of the control processor.

In the data transfer device according to this another exemplary embodiment of the invention, 1.0 the data receiving section may be connected to a plurality of partner devices via a common data bus, and may select the latch timing based on which of the plurality of the partner devices is using the data bus.

In the data transfer device according to this another exemplary embodiment of the invention, the data receiving section may perform selection of latch timing in such a manner that the reception data corresponding to each of the plurality of partner devices can be acquired at a constant timing irrespective of the partner device.

In the data transfer device according to this another exemplary embodiment of the invention, the clock sending section may transmit the transfer clock signal only to the partner device that is using the data bus.

The data transfer device according to another exemplary embodiment of the invention may include an in-device transfer section which receives the transfer clock signal and transmits data synchronized with the received transfer clock signal. The data receiving section may further include cascade-connected fourth and fifth latch circuits which latch the data from the in-device transfer section by synchronizing with the transfer clock signal, and may acquire the reception data from the output of the fifth latch circuit.

The data transfer device according to this another exemplary embodiment of the invention may further include a data output circuit which outputs transmission data to the partner device by synchronizing with the rise edge or the fall edge of the transfer clock signal.

The data transfer device according to this another exemplary embodiment of the invention may further include a data output circuit which outputs transmission data to the in-device transfer section by synchronizing with the rise edge or the fall edge of the transfer clock signal.

A data transfer method according to another exemplary embodiment of the invention is a data transfer method used in a data transfer device which includes: a clock sending section which transmits a transfer clock signal to a partner device; and a data receiving section which receives data synchronized with the transfer clock signal from the partner device. The data transfer method may be structured to latch the data at the rise edge or the fall edge of a delay clock signal that is delayed from the transfer clock signal by a prescribed amount, and to be able to select the latch result as reception data.

With the data transfer method according to this another exemplary embodiment of the invention, the latch timing may be selected by having the partner device output the data and by acquiring the reception data while changing a prescribed amount and the setting for selecting the latch timing in the selecting section.

With the data transfer method according to this another exemplary embodiment of the invention, the data transfer device may be connected to a plurality of partner devices via a common data bus, and may select the latch timing based on which of the plurality of the partner devices is using the data bus.

With the data transfer method according to this another exemplary embodiment of the invention, selection of latch timing may be performed in such a manner that the reception data corresponding to each of the plurality of partner devices can be acquired at a constant timing irrespective of the partner device.

With the data transfer device according to this another exemplary embodiment of the invention, the transfer clock signal may be transmitted only to the partner device that is using the data bus.

A data transfer device according to still another exemplary embodiment of the invention may be built as a data transfer circuit and a phase adjusting circuit, which are interposed between a master LSI that performs data transfer with a slave LSI and the slave LSI. In that case, the data transfer device according to this still another exemplary embodiment is mounted to the master LSI. The data transfer device according to this still another exemplary embodiment of the invention includes: a data output circuit which outputs the transfer clock from the master LSI to the slave LSI, and outputs the data to the master LSI by synchronizing with the rise edge or the fall edge of the transfer clock; and a data input circuit which can select, by the phase adjusting selector, the data latched by synchronizing with the rise edge of the transfer clock and the data latched by synchronizing with the fall edge. The slave LSI includes: a data input circuit which latches data by synchronizing with the fall edge or the rise edge of the transfer clock inverted from that of the data input circuit of the master LSI side; and a data output circuit which outputs data by synchronizing with the rise edge or the fall edge of the transfer clock.

Further, a data transfer device according to yet another exemplary embodiment of the invention may be built to include: a data output circuit which outputs the transfer clock from the master LSI to the slave LSI, and outputs the data to the master LSI by synchronizing with the rise edge or the fall edge of the transfer clock; and a data input circuit which latches the data by synchronizing with the rise edge or the fall edge of a phase-variable clock. The slave LSI includes: a data input circuit which latches data by synchronizing with the fall edge or the rise edge which is inverted from that of the transfer clock of the data output circuit of the master LSI side; and a data output circuit which outputs data by synchronizing with the rise edge or the fall edge of the transfer clock.

A data transfer device according to another exemplary embodiment of the invention may be built to include: a data output circuit which outputs the transfer clock from the master LSI to the slave LSI, and outputs the data to the master LSI by synchronizing with the rise edge or the fall edge of the transfer clock; and a data input circuit which can select, by the phase adjusting selector, the data latched by synchronizing with the rise edge or the fall edge of the transfer clock and the data latched by synchronizing with the rise edge or the fall edge of a phase-variable clock. The slave LSI includes: a data input circuit which latches data by synchronizing with the fall edge or the rise edge which is inverted from that of the transfer clock of the data output circuit of the master LSI side; and a data output circuit which outputs data by synchronizing with the rise edge or the fall edge of the transfer clock.

The data input circuit within the master LSI may be structured to be able to re-select, with the phase adjusting selector, the data from the data input circuit within the master LSI and the data that is latched by synchronizing with the rise edge or the fall edge of the transfer clock.

The control processor within the master LSI may perform the optimum latch timing judgment through transferring data from the slave LSI to the master LSI and acquiring the output from the data input circuit, while changing selection setting of the latch timing of the data input circuit within the master LSI and changing the phase setting in a case where the phase-variable clock is used.

It is also possible to include a phase adjusting register which stores data from the data input circuit of the master LSI side in order at the time of phase adjustment.

The control processor within the master LSI may perform the optimum latch timing judgment through transferring data from the slave LSI to the master LSI and reading the value of the phase adjusting register, while changing selection setting of the latch timing of the data input circuit within the master LSI and changing the phase setting in a case where the phase-variable clock is used.

It is also possible to include, within the master LSI, a data return circuit which performs processing for preventing abnormal actions of the control processor when adjusting the phase.

In a system including a plurality of slave LSIs in which the data bus between the LSIs is shared by the plurality of slave LSIs, the data input circuit within the master LSI may switch the set value of the phase adjustment selector depending on which of the slave LSIs is using the data bus.

In a system which also includes a slave core also within the master LSI, the data input circuit within the master LSI may include a circuit which latches the transfer data from the slave core twice by synchronizing with the transfer clock.

More specifically, in the data transfer device, the clock signal is transferred only from the master LSI to each slave LSI direction, and data transfer between the LSIs is performed by synchronizing with the common clock signal in order to synchronize the timings in the entire system. Further, for the clock frequency, selected is a clock frequency which satisfies the required performance of the actual device in order not to deteriorate the transfer throughput.

For the data transfer from the master LSI to the slave LSI, the data output circuit which outputs the data by synchronizing with the fall edge of the transfer clock is mounted to the master LSI side and the data input circuit which inputs the data by synchronizing with the rise edge of the transfer clock is mounted to the slave LSI side in order to be able to secure the setup time and the hold time regardless of the delay time between the LSIs. Inversely, it is also possible to employ a circuit structure with which the master LSI side outputs the data by synchronizing with the rise edge, and the slave LSI side latches the data by synchronizing with the fall edge. That is, mounted is the circuit structure with which the slave LSI side latches the input data by using a clock edge that is inverted from the clock edge that is used on the master LSI side for the output data.

For the data transfer from the slave LSI side to the master LSI side, in order to prepare for a case where the wiring delay exceeds an estimated value on the evaluation board or the like, there is provided a mechanism with which the master LSI side can select a plurality of latch timings such as the rise edge, the fall edge of the transfer clock, and the rise edge with 1-cycle delay for the data output circuit which outputs the data by synchronizing with the rise or the fall edge of the transfer clock from the slave LSI side so as to form the data input circuit with which the data can be transferred to the internal circuit of the master LSI side at the same timing at all times no matter which of the latch timings is selected.

For selecting the optimum latch timing (phase adjustment) when transferring data from the slave LSI to the master LSI, the phase-variable clock with finer precision than the plurality of latch timings described above is used. Further, there is also mounted a mechanism which can monitor the judgment result of the phase adjustment (wiring delay between the LSIs) on the outside the LSIs with several times finer precision than the transfer clock frequency. The control processor reads out the input data latched by using the phase-variable clock to judge the optimum latch timing.

Such data transfer device makes it possible to adjust the clocks and transfer timings of the entire system regardless of the wiring delay and the like between the LSIs, by transferring the clock only from the master LSI to the slave LSI direction to synchronize all data transfer among the LSIs synchronized with the transfer clock and by using the data output circuit which synchronizes with the fall edge on the master LSI side as well as the latch timing selecting circuit of the input data.

Further, the transfer clock is outputted from the master LSI to the slave LSI along with the transfer data, and the clock edge used for inputting the data on the slave LSI side is inverted from the clock edge used for outputting the data on the master LSI side. This makes it possible to secure the margin of the setup time and hold time regardless of the delay time between the LSIs.

Furthermore, when transferring the data from the slave LSI to the master LSI, the master LSI side can select the optimum latch timing of the input data from the plurality of timings, and the data can be transferred to the internal circuit of the master LSI with the same transfer timing no matter which latch timing is selected. The data input circuit with such structure makes it possible to perform synchronized data transfer regardless of the delay time between the LSIs. Further, with the data transfer device described above, pre-verification and board evaluation such as simulations can be performed equivalently with the actions of the actual device with the bit precision and cycle precision, so that it is expected to have increased verification precision.

Further, deterioration of the transfer throughput can be prevented since the clock frequency can be determined by considering the wiring delay of the actual device alone. Furthermore, the use of the phase-variable clock signals makes it possible to obtain the basis for judging the latch timing with several times finer precision than the transfer clock. Therefore, it becomes possible to select the more optimum latch timing.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

Figure 1:
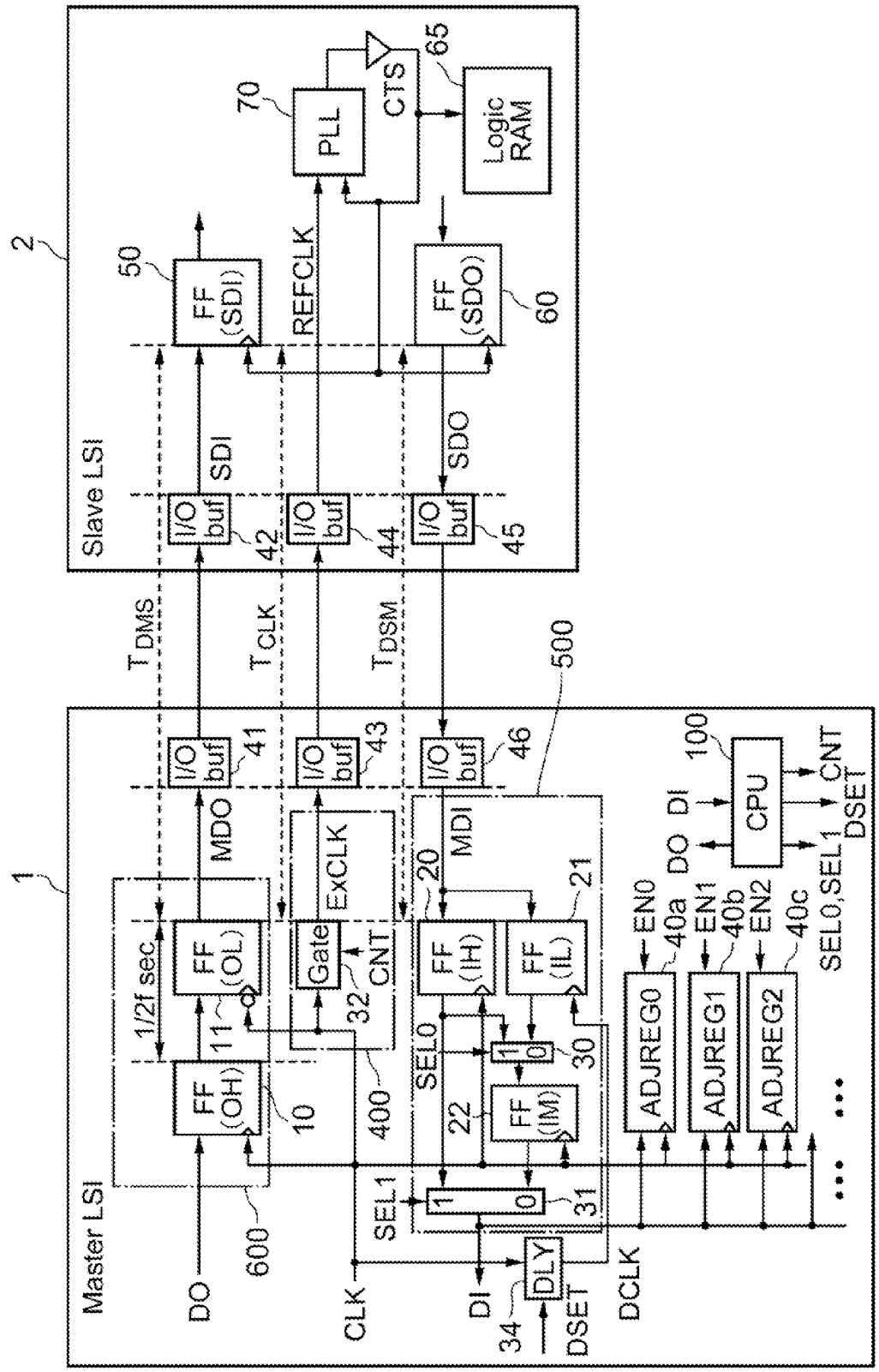
FIG. 1 is a block diagram showing a structure of a data transfer device according to a first exemplary embodiment of the invention.
Figure 2:
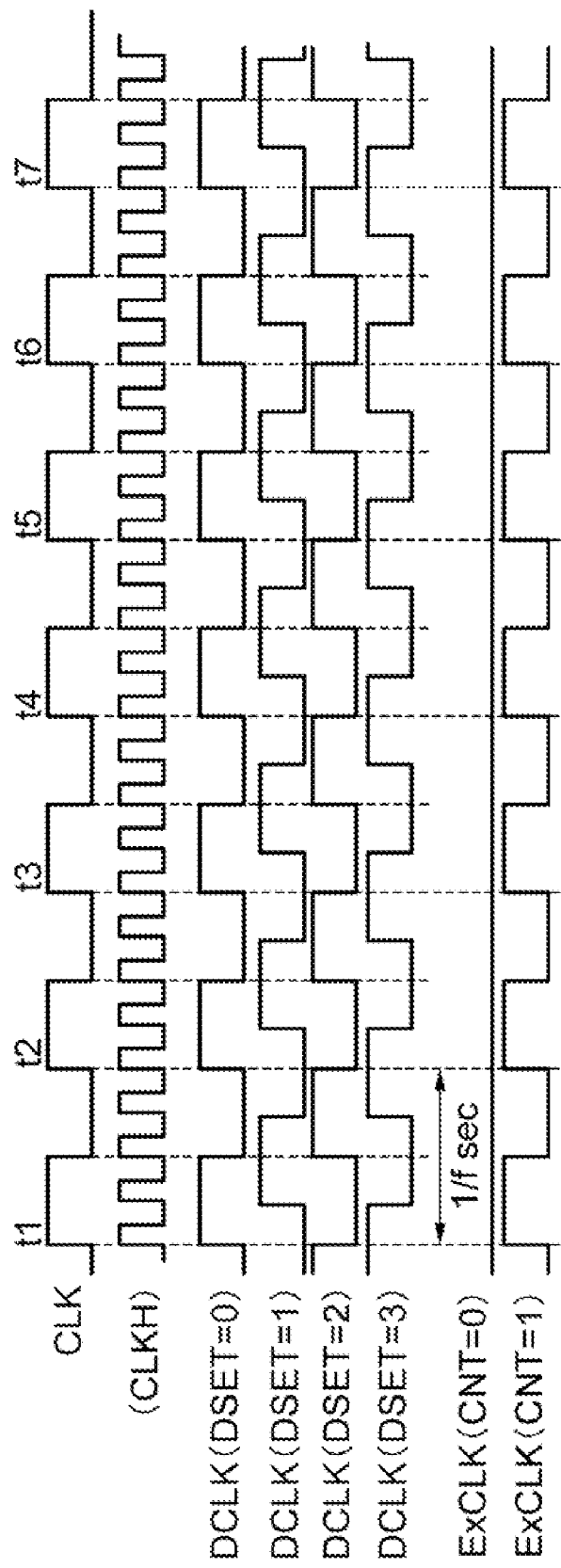
FIG. 2 is a chart showing relationships between waveforms and phases of clock signals of the data transfer device according to the first exemplary embodiment of the invention.
Figure 3:
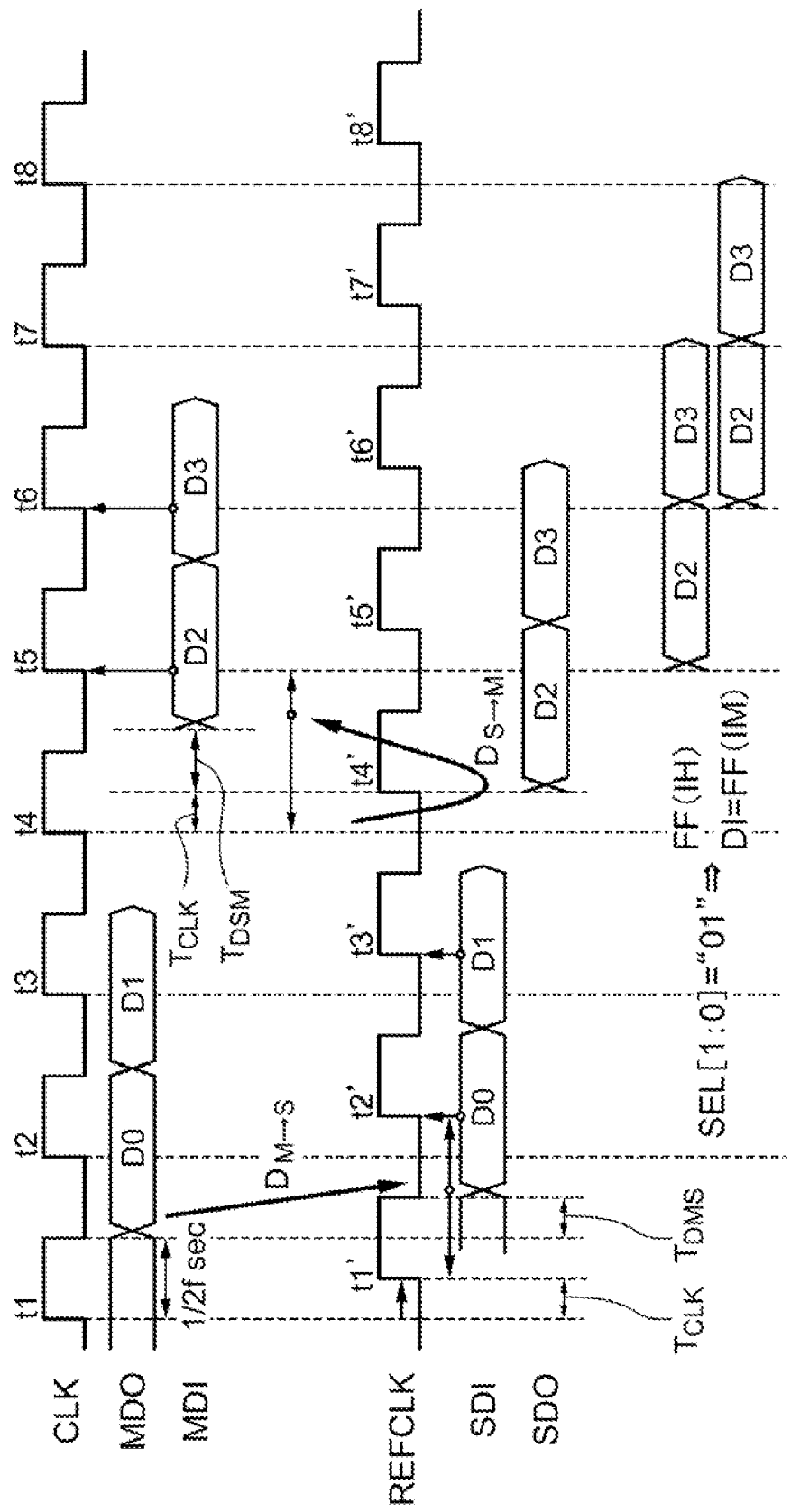
FIG. 3 is a chart showing transfer timings of a first data transfer method according to the first exemplary embodiment of the invention.
Figure 4:
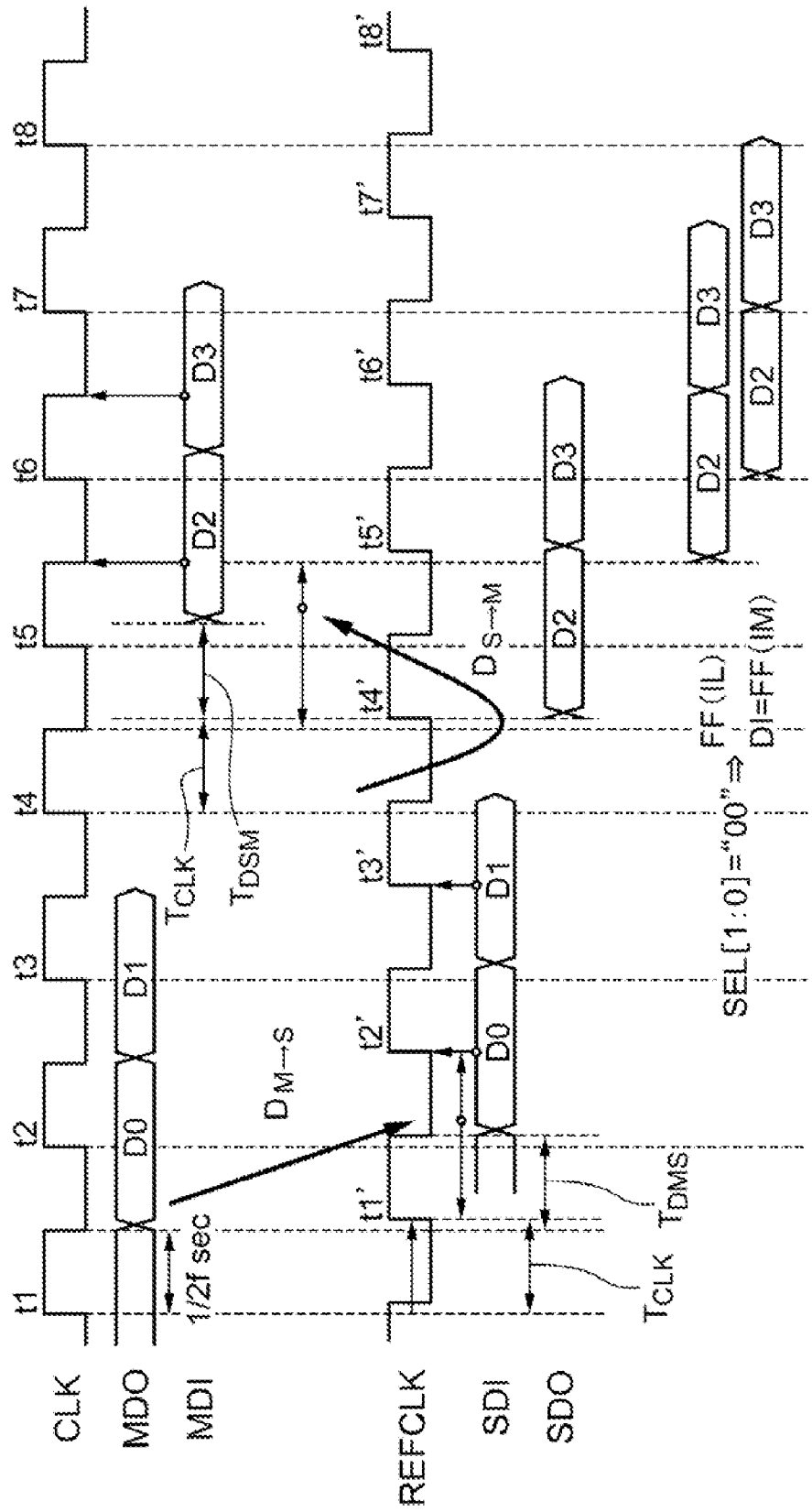
FIG. 4 is a chart showing transfer timings of a second data transfer method according to the first exemplary embodiment of the invention.
Figure 5:
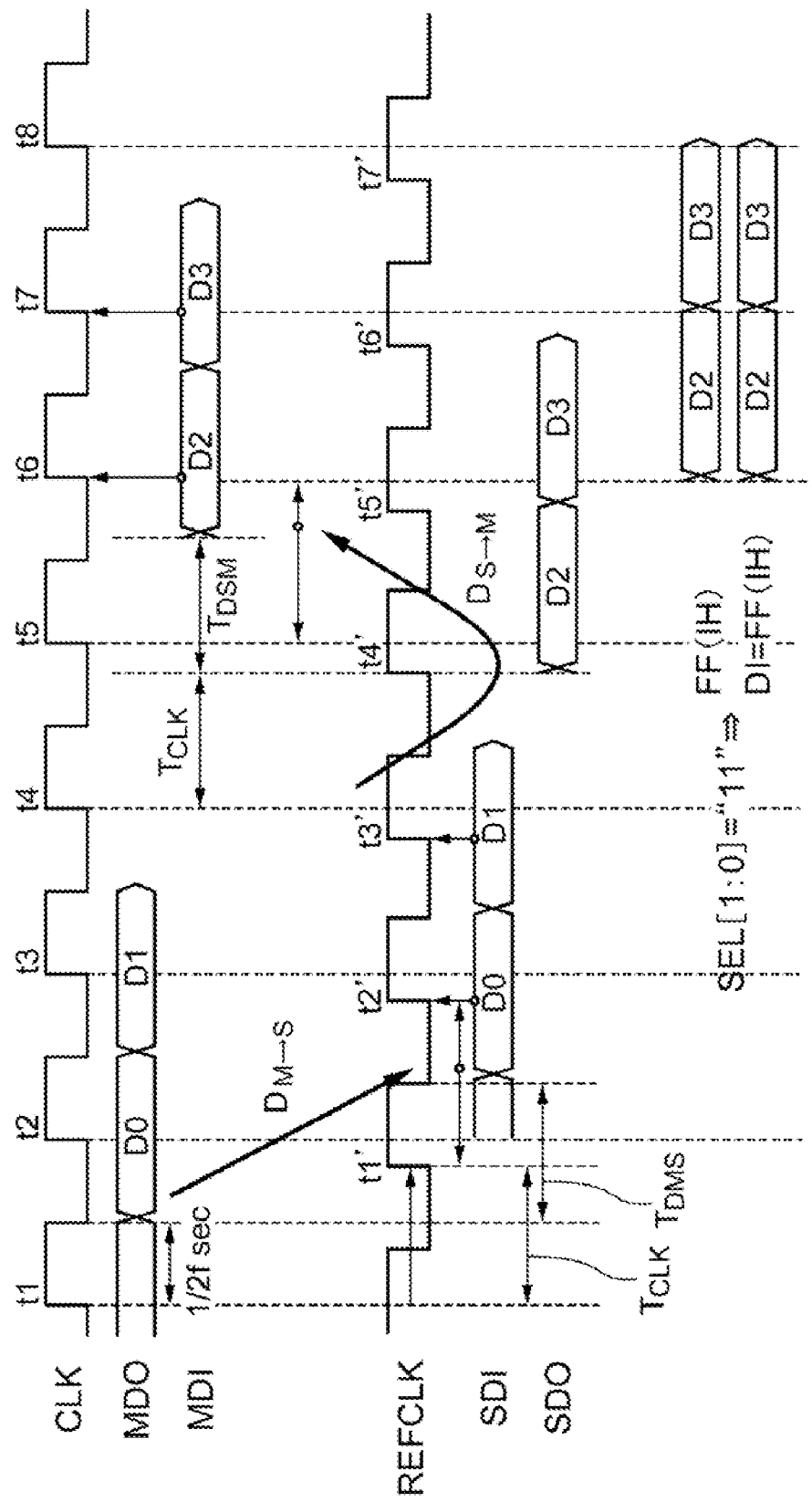
FIG. 5 is a chart showing transfer timings of a third data transfer method according to the first exemplary embodiment of the invention.
Figure 6:
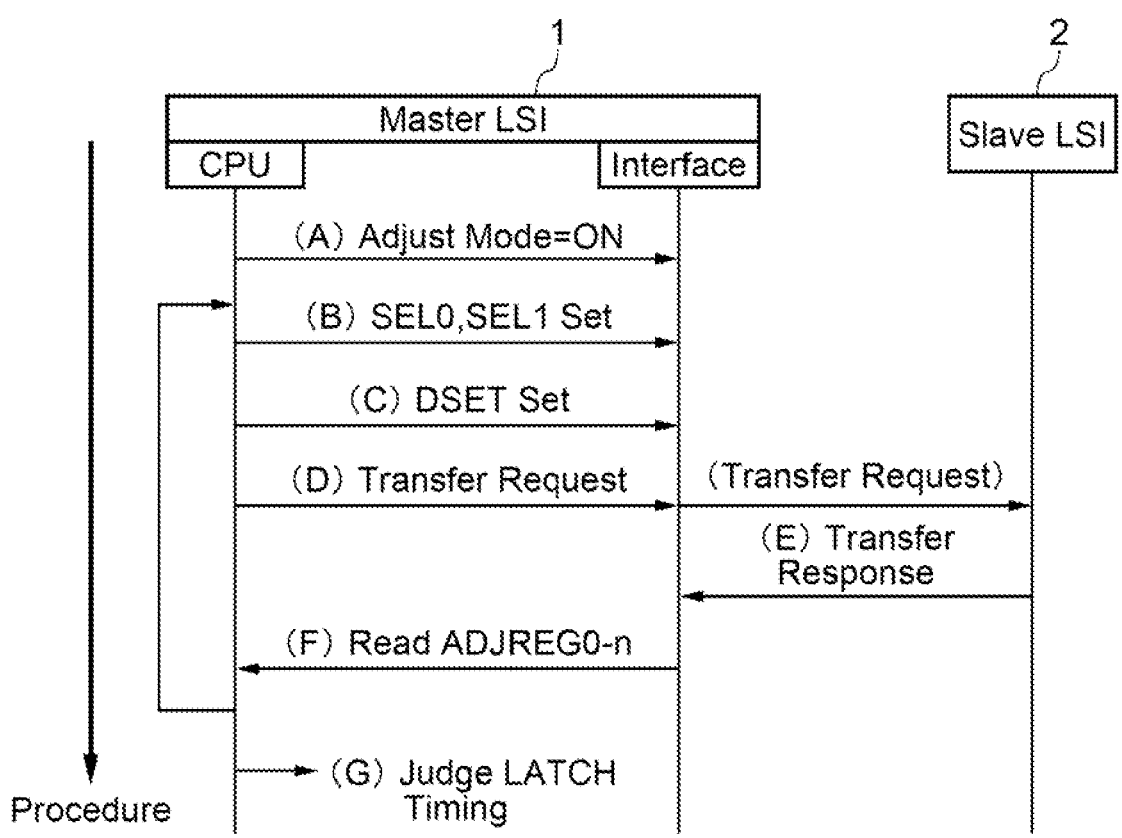
FIG. 6 is a chart showing an example of a sequence of a phase adjusting method according to the first exemplary embodiment of the invention.
Figure 7:
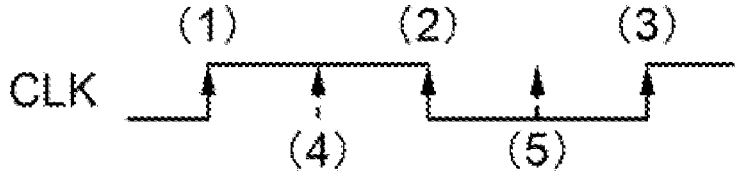
FIG. 7 is a chart showing phase adjustment setting combinations and latch timings according to data acquiring judgment results obtained with the setting combinations.
Figure 8:
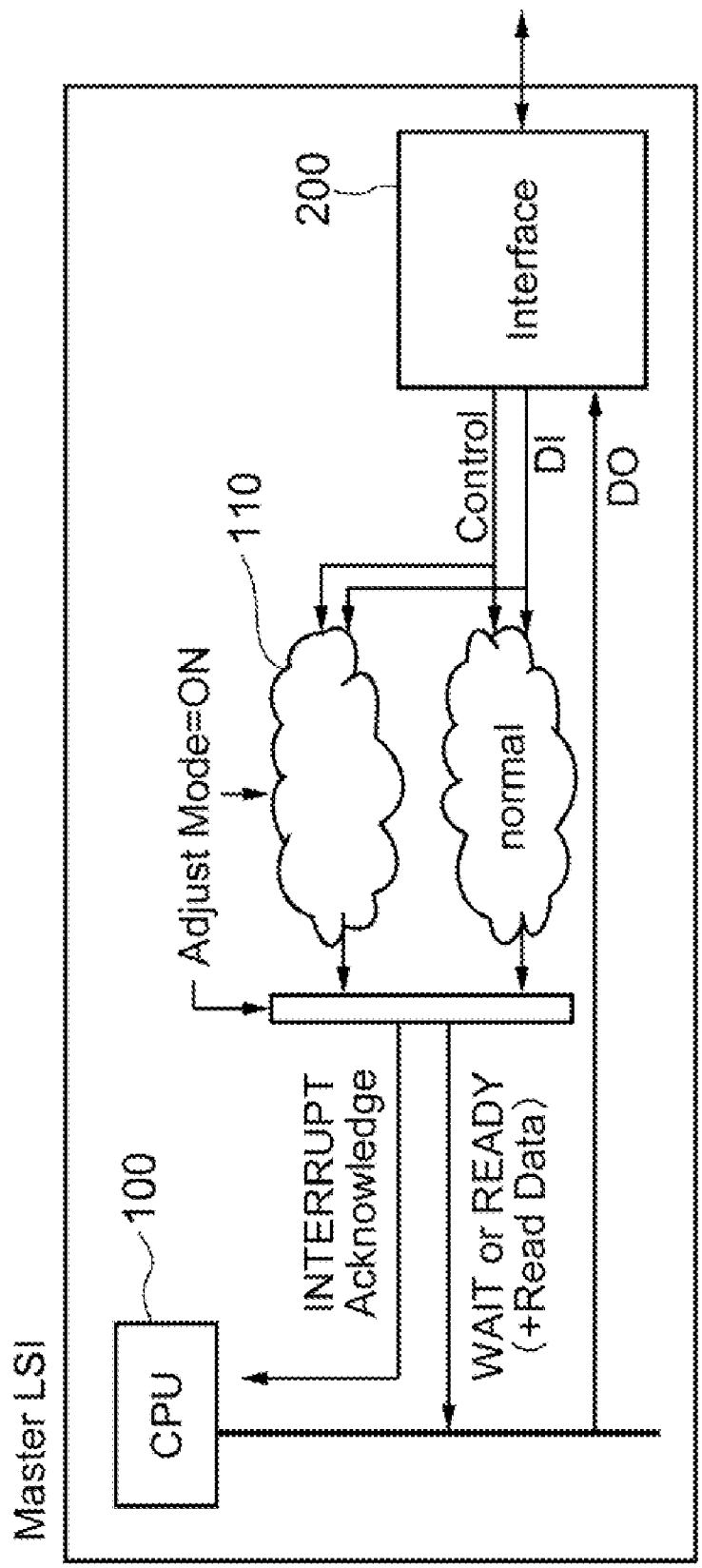
FIG. 8 is an illustration showing a data returning mechanism under a phase adjustment mode according to the first exemplary embodiment of the invention.
Figure 9:
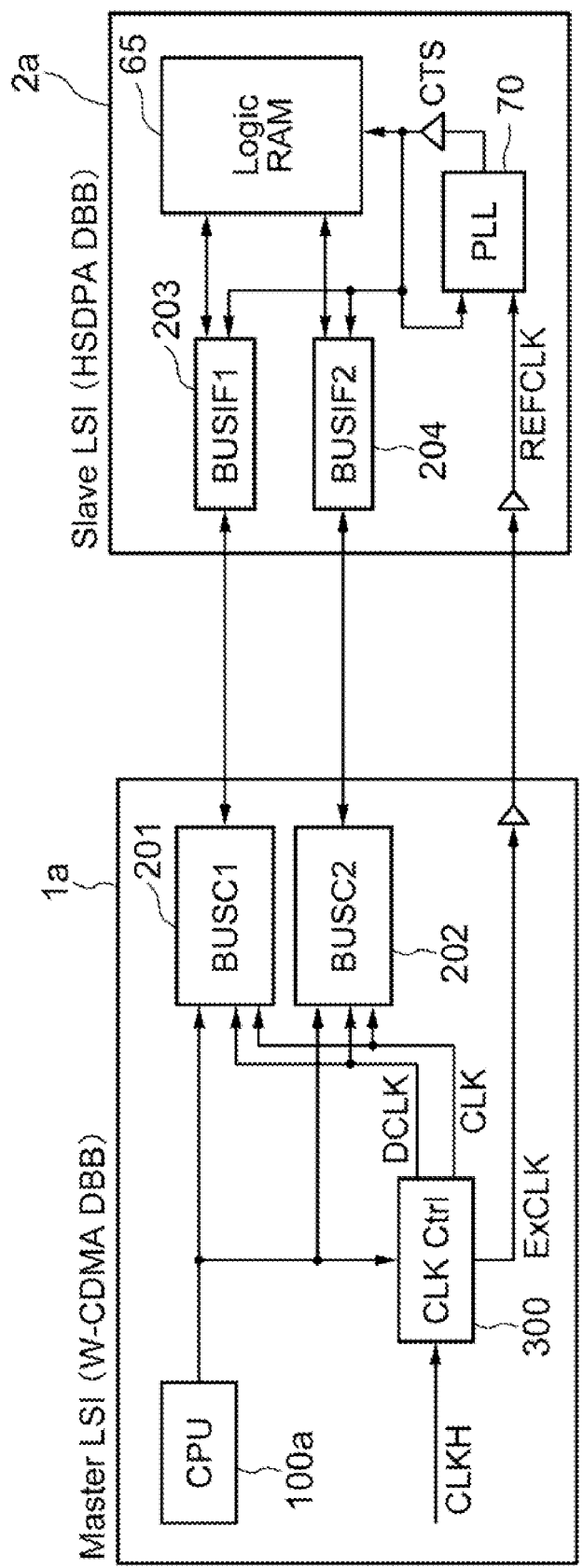
FIG. 9 is a block diagram showing a structure of a data transfer device according to EXAMPLE 1 of the present invention.
Figure 10:
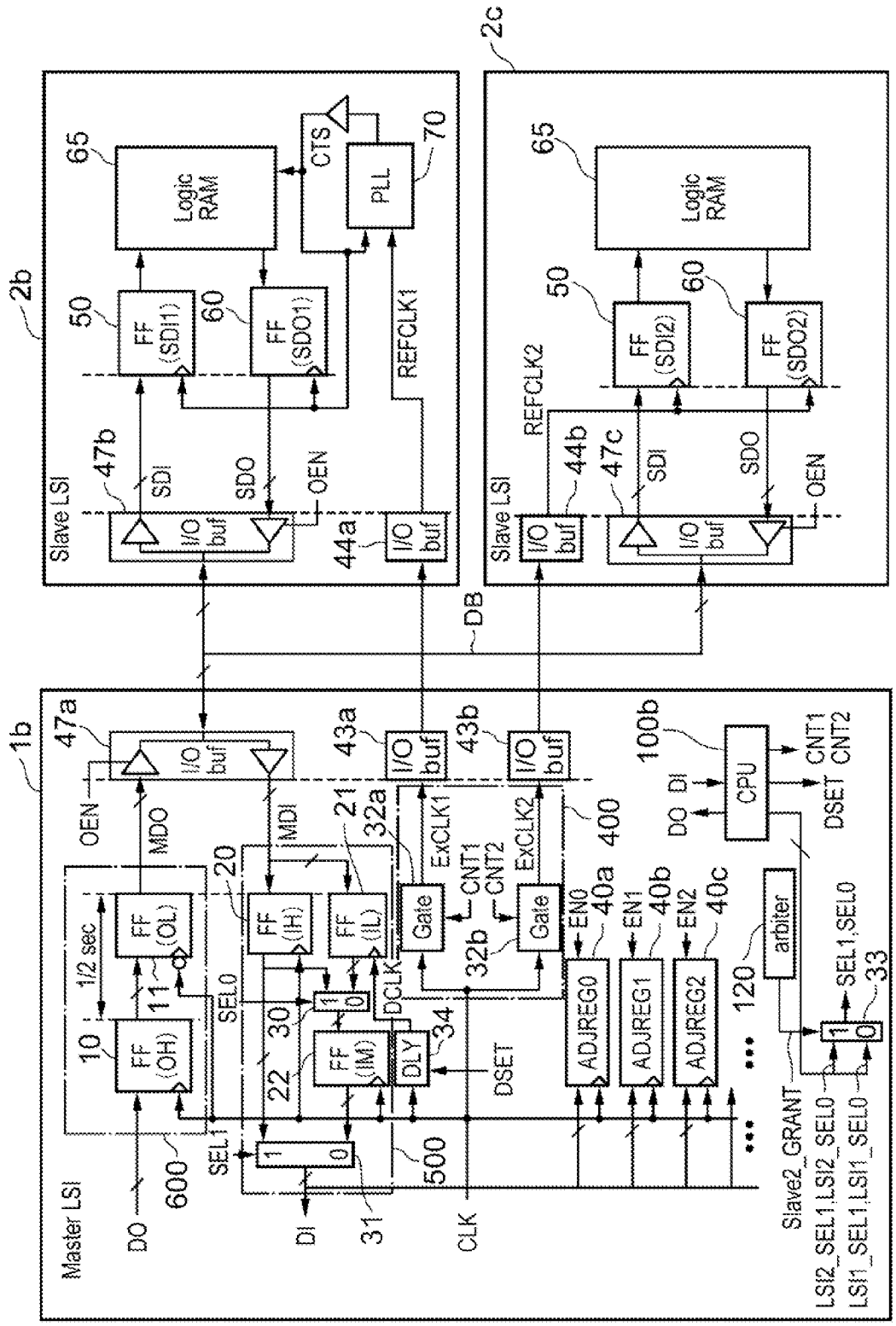
FIG. 10 is a block diagram showing a structure of a data transfer device according to a second exemplary embodiment of the invention.
Figure 11:
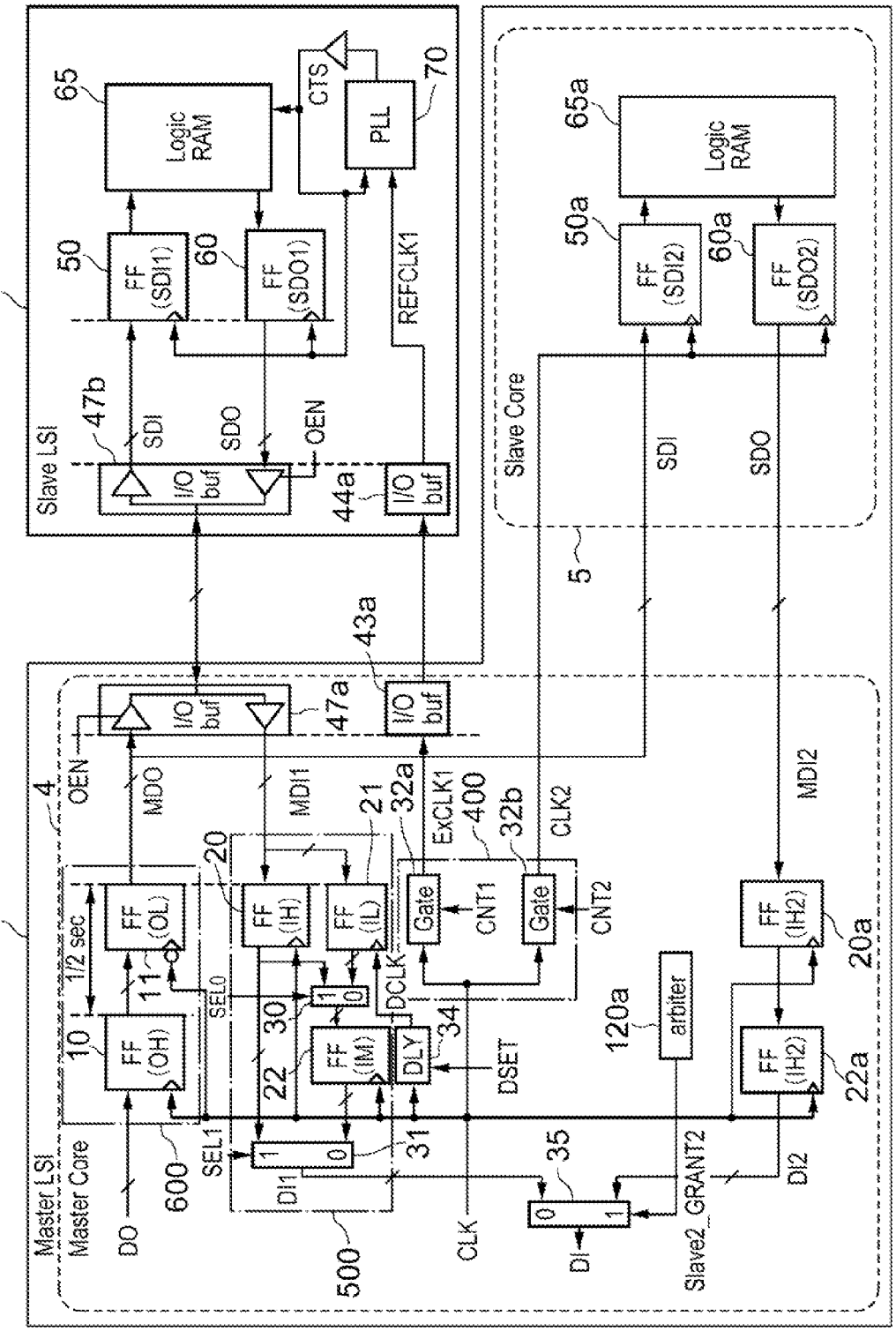
FIG. 11 is a block diagram showing a structure of a data transfer device according to a third exemplary embodiment of the invention.
Figure 12:
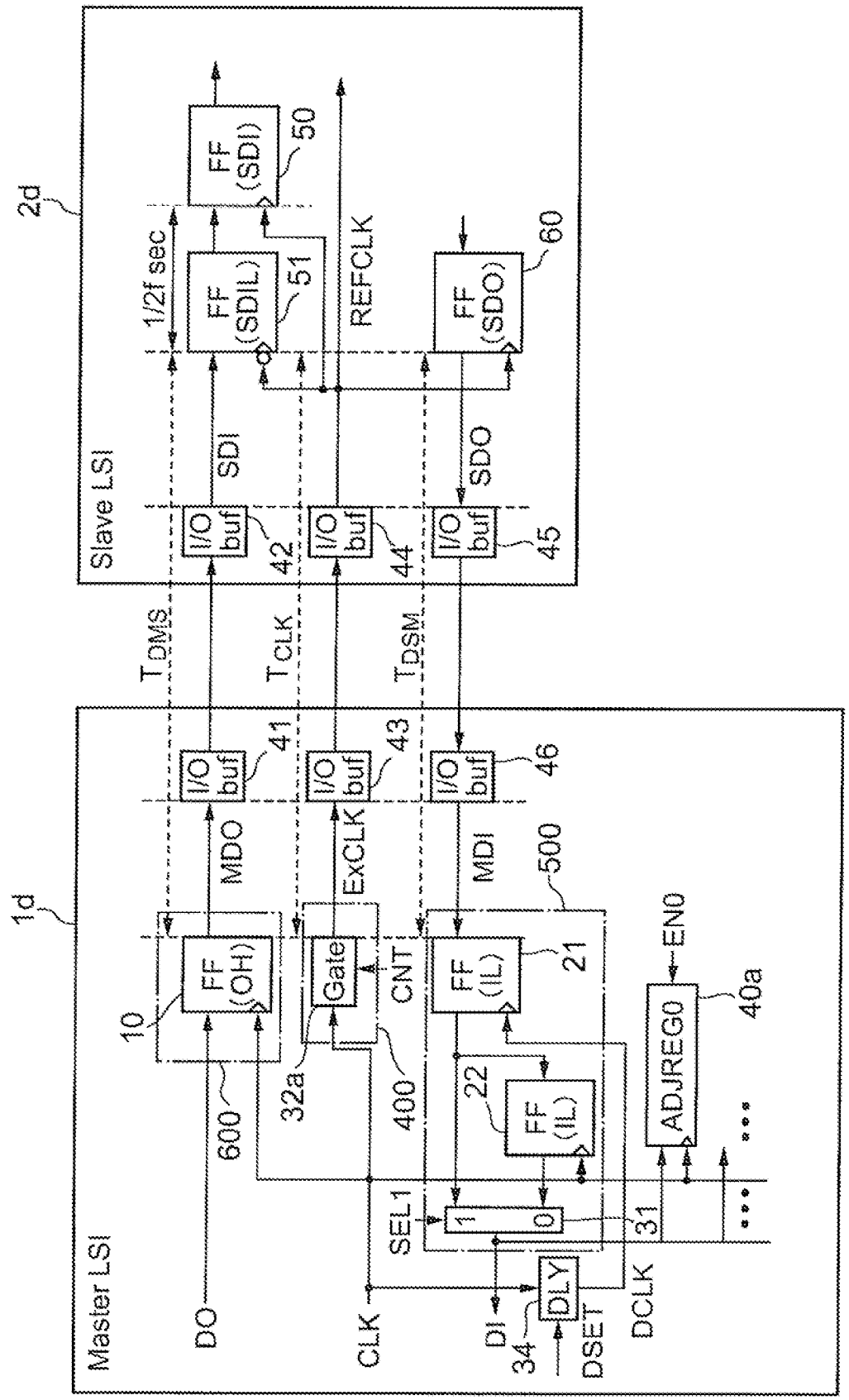
FIG. 12 is a block diagram showing a structure of a data transfer device according to a fourth exemplary embodiment of the invention.

REFERENCE NUMERALS 1, 1a, 1b, 1d Master LSI
2, 2a, 2b, 2c, 2d Slave LSI
4 Master core
5 Slave core
10, 11, 20, 20a, 21, 22, 22a, 50, 50a, 51, 60, 60a Flip-flop
30, 31, 33, 35 Selecting circuit
32, 32a, 32b Gate circuit
34 Delay register
40a, 40b, 40c, - - - Phase adjusting register
41-46, 43a, 43b, 44a, 44b, 47a, 47b, 47c Input/output buffer
65, 65a Internal circuit
70 PLL circuit
100, 100a, 100b Control processor (CPU)
110 Return signal generating circuit
120, 120a Arbiter
200 Interface circuit
201, 202 Bus controller circuit
203, 204 Bus interface circuit
300 Clock control circuit
301 Phase-variable clock phase control circuit
400 Clock sending section
500 Data receiving section
600 Data output circuit

What is claimed is:

1. A data transfer device which performs data transfer with a partner device, the data transfer device comprising:
a clock sending section which transmits a transfer clock signal to the partner device; and
a data receiving section which receives data synchronized with the transfer clock signal from the partner device, wherein
the data receiving section includes:
a first latch circuit which latches the data at a rise edge or a fall edge of a delay clock signal which is delayed from the transfer clock signal by a variable delay amount;
a second latch circuit which latches the data at a rise edge or a fall edge of the transfer clock signal; and
a first selecting section which selects an output signal of the first latch circuit or an output signal of the second latch circuit as reception data.

2. The data transfer device as claimed in claim 1, wherein the data receiving section comprises:
a third latch circuit which latches the data outputted from the first selecting section at the rise edge or the fall edge of the transfer clock signal; and
a second selecting section which selects the output signal of the second latch circuit or an output signal of the third latch circuit as the reception data.

3. The data transfer device as claimed in claim 1, wherein the data receiving section comprises:
a fourth latch circuit which latches the output signal of the first latch circuit at the rise edge or the fall edge of the transfer clock signal; and
a third selecting section which selects an output signal of the fourth latch circuit as the reception data.

4. The data transfer device as claimed in claim 1, comprising a control processor which controls selection of latch timings for acquiring data synchronized with the transfer clock signal outputted from the partner device as the reception data by changing a setting of the timings when the selecting section latches the data and by changing delay amount of the transfer clock signal.

5. The data transfer device as claimed in claim 4, comprising a phase adjusting register which stores the reception data, wherein
the control processor performs the selection of the latch timings by reading out a value of the phase adjusting register at the time of phase adjustment.

6. The data transfer device as claimed in claim 4, comprising a return signal generating circuit which generates a signal for preventing abnormal actions at the time of phase adjustment of the control processor.

7. The data transfer device as claimed in claim 4, wherein the data receiving section is connected to a plurality of partner devices via a common data bus, and selects the latch timing based on which of the plurality of the partner devices is using the data bus.

8. The data transfer device as claimed in claim 7, wherein the data receiving section performs the selection of the latch timings in such a manner that the reception data corresponding to each of the plurality of partner devices can be acquired at a constant timing irrespective of the partner device.

9. The data transfer device as claimed in claim 7, wherein the clock sending section transmits the transfer clock signal only to the partner device that is using the data bus.

10. The data transfer device as claimed in claim 1, comprising an in-device transfer section which receives the transfer clock signal and transmits data synchronized with the received transfer clock signal, wherein
the data receiving section further includes cascade-connected fifth and sixth latch circuits which latch the data from the in-device transfer section by synchronizing with the transfer clock signal, and acquires the reception data from an output of the sixth latch circuit.

11. The data transfer device as claimed in claim 1, further comprising a data output circuit which outputs transmission data to the partner device by synchronizing with the rise edge or the fall edge of the transfer clock signal.

12. The data transfer device as claimed in claim 10, further comprising a data output circuit which outputs transmission data to the in-device transfer section by synchronizing with the rise edge or the fall edge of the transfer clock signal.

13. A data transfer method which performs data transfer with a partner device by transmitting a transfer clock signal and data synchronized with a rise edge or a fall edge of the transfer clock signal and by receiving data synchronized with the transfer clock signal from the partner device, the method comprising:
latching the data at a rise edge or a fall edge of a delay clock signal which is delayed from the transfer clock signal by a variable delay amount; and
changing a setting of the timings for latching the data and changing the delay amount so as to optimize the timing for latching reception data acquired from the partner device.

14. The data transfer method as claimed in claim 13, comprising:
transferring the data to a plurality of the partner devices via a common data bus; and selecting the latch timing based on which of the plurality of the partner devices is using the data bus.

15. The data transfer method as claimed in claim 14, wherein
the latch timing is selected in such a manner that the reception data corresponding to each of the plurality of partner devices can be acquired at a constant timing irrespective of the partner device.

16. The data transfer method as claimed in claim 14, wherein
the transfer clock signal is transmitted only to the partner device that is using the data bus.

17. Data transfer means for performing data transfer with a partner device, the data transfer means comprising:
clock sending means for transmitting a transfer clock signal to the partner device; and
data receiving means for receiving data synchronized with the transfer clock signal from the partner device, wherein
the data receiving means includes:
first latch means for latching the data at a rise edge or a fall edge of a delay clock signal which is delayed from the transfer clock signal by a variable delay amount;
second latch means for latching the data at a rise edge or a fall edge of the transfer clock signal; and
first selecting means for selecting an output signal of the first latch means or an output signal of the second latch means as reception data.

* * * * *